United States Patent
Lin et al.

(10) Patent No.: US 8,612,169 B2
(45) Date of Patent: Dec. 17, 2013

(54) METHOD AND SYSTEM FOR DETECTING ANOMALIES IN A BIPARTITE GRAPH

(75) Inventors: Ching-Yung Lin, Scarsdale, NY (US); Hanghang Tong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/094,724

(22) Filed: Apr. 26, 2011

(65) Prior Publication Data

US 2012/0278021 A1 Nov. 1, 2012

(51) Int. Cl.
*G06F 19/00* (2011.01)

(52) U.S. Cl.
USPC .............................. 702/85; 235/380; 707/737

(58) Field of Classification Search
USPC ........... 702/85, 122, 123, 179, 180, 182, 183, 702/186, 188; 235/380; 707/737, 760, 765; 708/200, 205, 207; 715/733; 726/22
See application file for complete search history.

(56) References Cited

U.S. PATENT DOCUMENTS

| | | | |
|---|---|---|---|
| 6,067,259 A | 5/2000 | Handa et al. | |
| 7,562,814 B1 | 7/2009 | Shao et al. | |
| 7,743,058 B2 * | 6/2010 | Liu et al. | 707/737 |
| 2005/0206644 A1 | 9/2005 | Kincaid | |
| 2008/0109730 A1 | 5/2008 | Coffman et al. | |
| 2008/0263663 A1 | 10/2008 | Ide et al. | |
| 2009/0138590 A1 | 5/2009 | Lee et al. | |
| 2009/0234899 A1 | 9/2009 | Kramer | |
| 2010/0095374 A1 | 4/2010 | Gillum et al. | |
| 2010/0299379 A1 | 11/2010 | Das Gupta et al. | |
| 2010/0306290 A1 | 12/2010 | Zhang et al. | |

OTHER PUBLICATIONS

Hanghang Tong, et al., "Colibri: Fast Mining of Large Static and Dynamic Graphs", KDD'08, Aug. 2008, Las Vegas, Nevada, USA, pp. 686-694.

* cited by examiner

*Primary Examiner* — John H Le
(74) *Attorney, Agent, or Firm* — Vazken Alexanian; McGinn IP Law Group, PLLC

(57) ABSTRACT

A method of detecting anomalies from a bipartite graph includes analyzing the graph to determine a row-cluster membership, a column-cluster membership and a non-negative residual matrix, and in a processor, detecting the anomalies from the non-negative residual matrix.

22 Claims, 17 Drawing Sheets

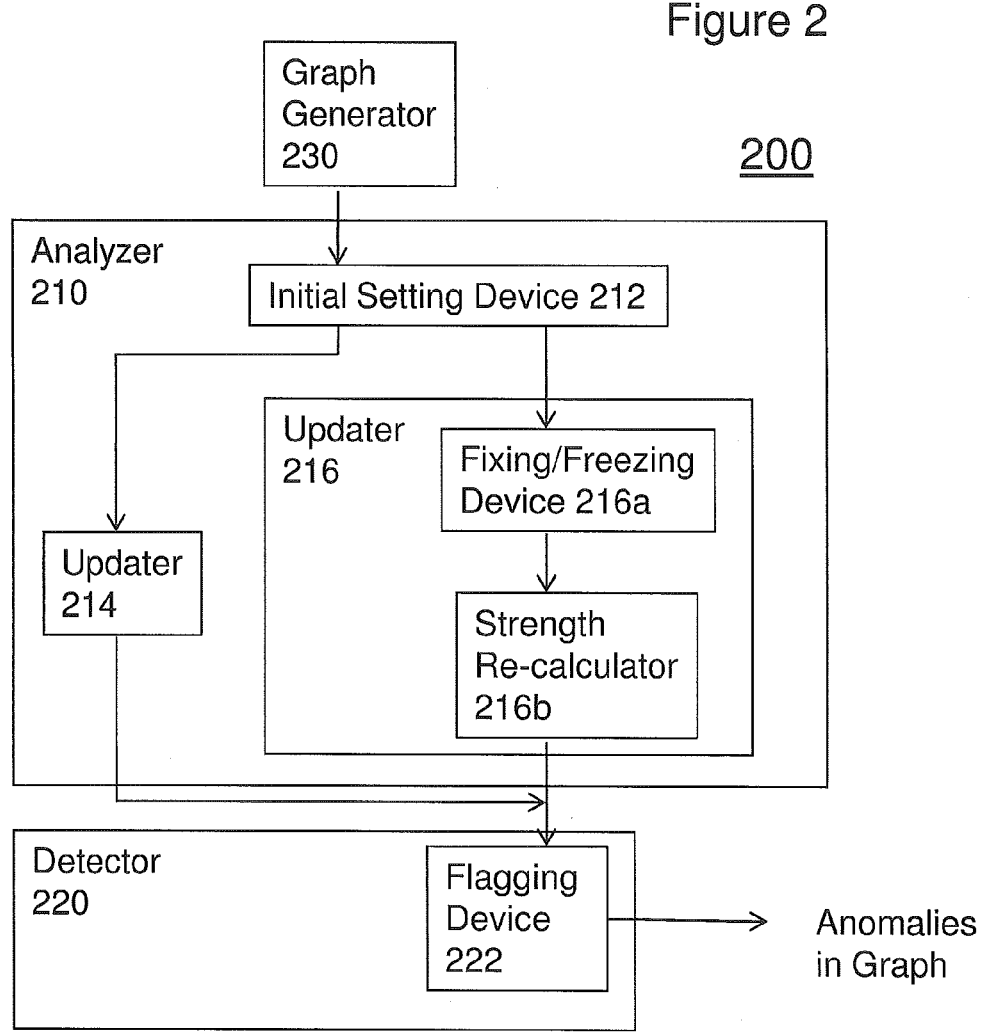

METHOD AND SYSTEM FOR DETECTING ANOMALIES IN A BIPARTITE GRAPH

This invention was made with Government support under Contract No. W911NF-09-2-0053 (Army Research Office (ARO)). The Government has certain rights in this invention.

BACKGROUND OF THE INVENTION

1. Field of the Invention

The present invention relates to a method and system of detecting anomalies in a bipartite graph and, more particularly, a method and system of detecting anomalies in a bipartite graph which includes detecting the anomalies from a non-negative residual matrix.

2. Description of the Related Art

There are two main drawbacks for conventional solutions for graph anomaly detection. First, conventional methods ignore the usability issue in anomaly detections on graphs. For example, some conventional methods use the residual matrix through matrix factorization to identify abnormal W sources. However, the resultant matrix can contain negative values which makes it hard to interpret the results.

Second, some conventional methods do not scale well. Therefore, such methods are not suitable for large graphs

SUMMARY OF THE INVENTION

In view of the foregoing and other problems, disadvantages, and drawbacks of the aforementioned conventional systems and methods, an exemplary aspect of the present invention is directed to a method of method of detecting anomalies in a large bipartite graph which is more effective and more efficient than conventional methods and systems.

An exemplary aspect of the present invention is directed to a method of detecting anomalies from a bipartite graph. The method includes analyzing the graph to determine a row-cluster membership, a column-cluster membership and a non-negative residual matrix, and in a processor, detecting the anomalies from the non-negative residual matrix.

Another exemplary aspect of the present invention is directed to a system for detecting anomalies from a bipartite graph. The system includes an analyzer for analyzing the graph to determine a row-cluster membership, a column-cluster membership and a non-negative residual matrix, and a detector for detecting the anomalies from the non-negative residual matrix.

Another exemplary aspect of the present invention is directed to a programmable storage medium tangibly embodying a program of machine-readable instructions executable by a digital processing apparatus to perform a method of detecting anomalies from a bipartite graph, the method including analyzing the graph to determine a row-cluster membership, a column-cluster membership and a non-negative residual matrix, and in a processor, detecting the anomalies from the non-negative residual matrix.

With its unique and novel features, the present invention provides a method of method of detecting anomalies in a large bipartite graph which is more effective and more efficient than conventional methods and systems.

BRIEF DESCRIPTION OF THE DRAWINGS

The foregoing and other objects, aspects and advantages will be better understood from the following detailed description of the embodiments of the invention with reference to the drawings, in which:

FIG. 2 illustrates a system 200 for detecting anomalies in a bipartite graph, in accordance with an exemplary aspect of the present invention;

DETAILED DESCRIPTION OF THE EXEMPLARY EMBODIMENTS OF THE INVENTION

Figure 1:
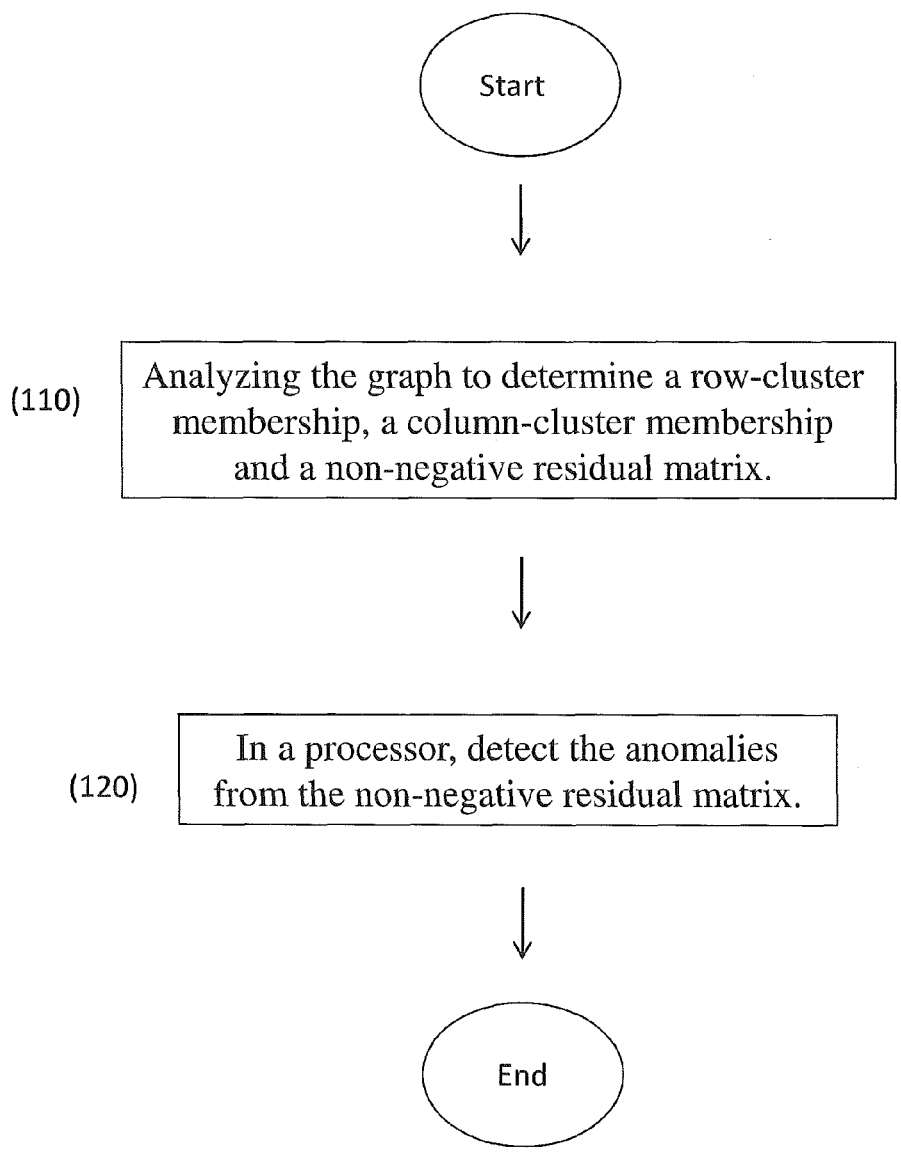
FIG. 1 illustrates a method 100 of detecting anomalies in a bipartite graph, in accordance with an exemplary aspect of the present invention.

Referring now to the drawings, FIGS. 1-9 illustrate the exemplary aspects of the present invention.

Overview

Large bi-partite graphs may be used to represent systems in a wide range of settings, including for example, social networks, computer networks financial transaction networks, criminal networks, telecommunication networks, user-movie rating graphs in collaborative filtering, the world wide web, biological networks, and many more.

It is desirable to be able to effectively and efficiently detect anomalies in such graphs. For example, by detecting such anomalies, one may be able to detect spammers, port scanners and vulnerable machines in computer network, detect fraudulent transactions (e.g., money-laundering schemes) and scammers in a financial transaction network, detect new criminal trends in criminal networks, and detect a telemarketer in a telecommunication network.

Some problems that the inventors sought to solve with the present invention include the following: 1) given a large IP source-destination traffic network, how does one spot misbehavioral IP sources (e.g., port-scanner); 2) how does one find strange users in a user-movie rating graph; and 3) how can one present the results intuitively so that it is relatively easier for data analysts to interpret? In other words, given a large bipartite graph, the inventors wanted to find anomalies in an intuitive and scalable way.

The exemplary aspects of the present invention may include two important ideas, each of which corresponds to the two main drawbacks of the conventional methods. First, exemplary aspects of the present invention may generate a residual graph from the original graph, through a novel non-negative residual matrix factorization, as an intuitive way to find and present the anomalies on graphs. Second, the exemplary aspects of the present invention may be carefully designed so that it scales linearly with respect to the size of the graph.

In particular, the exemplary aspects of the present invention may utilize NrMF, a non-negative residual matrix factorization framework, to solve the problems which are not addressed by the conventional methods. The exemplary aspects of the present invention may provide an optimization formulation as well as an effective algorithm to solve it. An exemplary method of the present invention may naturally capture abnormal behaviors on graphs. In addition, a proposed algorithm of the present invention may be linear with respect to the size of the graph, and therefore, the algorithm is suitable for large graphs. The experimental results on several data sets validate its effectiveness as well as efficiency.

As illustrated in FIG. 1, an exemplary aspect of the present invention is directed a method 100 (e.g., a computer-implemented method) of detecting anomalies (e.g., abnormal nodes and edges) from a bipartite graph. The method 100 includes analyzing (110) the graph to determine a row-cluster membership, a column-cluster membership and a non-negative residual matrix, and in a processor (e.g., a processor included in a computer), detecting (120) the anomalies from the non-negative residual matrix.

The method 100 may also be hardware implemented and/or software implemented. For example, the method 100 may utilize an anomaly detection software program of machine-readable instructions executable by a digital processing apparatus to perform the method 100.

The method 100 may also include providing the graph (e.g., generating the graph from a data set). Further, the analyzing of the graph may include inferring the row-cluster membership, column-cluster membership and non-negative residual matrix from the graph, and detecting of anomalies may include flagging abnormalities in the non-negative residual matrix.

For example, the bipartite graph may include a people-activity graph and the anomalies comprise abnormal human behavior. In this case, the method 100 may include generating the people-activity graph from activity logs of a set of people, the analyzing the graph to determine the row-cluster membership, the column-cluster membership and the non-negative residual matrix may include inferring people-community membership, community-activity membership and a non-negative people-activity residual matrix, and the detecting of anomalies may include flagging the abnormal human behavior from the non-negative people-activity residual matrix.

Further, the inferring of the people-community membership, community-activity membership and a non-negative people-activity residual matrix may include setting an initial people-community membership, an initial community-activity membership, and an initial non-negative people-activity residual matrix, updating the initial people-community membership; and updating the initial community-activity membership. The updating of the initial people-community membership may include fixing and/or freezing the community-activity membership, and re-calculating a strength of each person belonging to each community.

Alternatively, the inferring of the people-community membership, community-activity membership and a non-negative people-activity residual matrix may include setting an initial non-negative people-activity residual matrix, inferring a rank-1 people-community membership and a rank-1 community-activity membership, and updating the non-negative people-activity residual matrix. In this case, the inferring of the rank-1 people-community membership and the rank-1 community-activity membership may include setting an initial rank-1 people-community membership, an initial-rank-1 community-activity membership, and an initial non-negative people-activity residual matrix, updating the initial rank-1 people-community membership, and updating the initial rank-1 community-activity membership. Further, the updating of the initial rank-1 people-community membership may include fixing and/or freezing the rank-1 community-activity membership, and re-calculating a strength of each person belonging to the community.

As another example, the bipartite graph may include an Internet Protocol (IP) source-destination graph and the anomalies may include abnormal IP addresses. In this case, the method 100 may include generating an IP source-destination graph from IP trace logs. Further, the analyzing of the graph to determine the row-cluster membership, the column-cluster membership and the non-negative residual matrix may include inferring an IP source-role membership, an IP destination-role membership and a non-negative IP source-destination residual matrix, and the detecting of anomalies may include flagging abnormal IP addresses from the non-negative IP source-destination residual matrix.

FIG. 2 illustrates a system 200 for detecting anomalies from a bipartite graph. The system 200 includes an analyzer 210 for analyzing the graph to determine a row-cluster membership, a column-cluster membership and a non-negative residual matrix, and a detector 220 (e.g., a processor that is part of a computer) for detecting the anomalies from the non-negative residual matrix.

The system 200 may also be hardware implemented and/or software implemented. For example, the system 200 may include an anomaly detection software program of machine-readable instructions executable by a digital processing apparatus to perform a method of detecting anomalies in a large bipartite graph.

The system 200 may also include a graph generator 230 for generating the graph from a data set. Further, the analyzer 210 may infer the row-cluster membership, column-cluster membership and non-negative residual matrix from the graph, and the detector 220 may include a flagging device 222 for flagging abnormalities in the non-negative residual matrix.

Further, the analyzer 210 may include an initial setting device 212 for setting an initial row-cluster membership, an initial column-cluster membership, and an initial non-negative residual matrix, an updater 214 for updating the initial row-cluster membership, and an updater 216 for updating the initial column-cluster membership. The updater 216 for updating the initial column-cluster membership may include a fixing/freezing device 216a for fixing and/or freezing the column-cluster membership, and a strength re-calculator 216b for re-calculating a strength of each member in the column-cluster membership.

Alternatively, the analyzer 210 may include an initial setting device for setting an initial non-negative residual matrix, and an updater for updating the initial non-negative residual matrix. In this case, the analyzer 210 may infer a rank-1 row-cluster membership and a rank-1 column-cluster membership by setting an initial rank-1 row-cluster membership, an initial rank-1 column-cluster membership, and an initial non-negative residual matrix, updating the initial rank-1 row-cluster membership, and updating the initial rank-1 column-cluster membership. Further, the updater for updating the initial rank-1 row-cluster membership may include a fixing/freezing device for fixing and/or freezing the rank-1 column-cluster membership, and a strength re-calculator for re-calculating a strength of each member in the column-cluster membership.

It should be noted that the system 200 may be implemented in a computer system, and that one or more of the features of the system 200 (e.g., analyzer 210, detector 220, graph generator 230, flagging device 222, initial setting device 212, updater 214, updater 216, fixing/freezing device 216a and strength re-calculator 216b) may be implemented by one or more processors of a computer system.

Detailed Discussion of Algorithms of Exemplary Aspects of the Present Invention

The present invention may deal with the issue of how can one find patterns (e.g., communities and anomalies) in a large sparse graph.

Naturally, low-rank approximations on the adjacency matrices of the graph provide powerful tools for detecting anomalies in the graph.

Formally, let A be the adjacency matrix of the graph, a rank r approximation of matrix A is a matrix Ã, where Ã is of rank r and the residual matrix (A−Ã) has small norm. The low-rank approximation is usually presented in a factorized form e.g., A=Ã+R=FG+R where F, G are the factorized matrices of rank r, and R is the residual matrix. The factorized matrices F and G can naturally reveal the community structure in the graph. The residual matrix R, on the other hand, is often a strong indicator for anomalies on graphs (e.g., a large norm of the residual matrix R suggests a significant deviation from low-rank structure in the graph).

From an algorithmic aspect, a recent trend in matrix factorization is to improve the interpretation of such graph mining results. To name a few, non-negative matrix factorization methods restrict the entries in F and G to be non-negative; example-based methods generate sparse de-composition by requiring the columns of the matrix F to be the actual columns of the original matrix A; etc. By imposing such non-negativity and/or sparseness constrains on the factorized matrices, it is relatively easier to interpret the community detection results. Actually, it is now widely realized that non-negativity is a highly desirable property for interpretation since negative values are usually hard to interpret. However, most, if not all, of these constraints (i.e., non-negativity, sparseness, etc) are imposed on the factorized matrices. Consequently, these existing methods are tailored for the task of community detection. It is not clear how to improve the interpretation for the task of anomaly detection from the algorithmic aspect. An issue that may be addressed by the present invention is whether similar constraints (e.g., non-negativity) be imposed on the residual matrix R to improve the interpretation for graph anomaly detection.

From an application side, it is often the case that anomalies on graphs correspond to some actual behaviors/activities of certain nodes. For instance, an IP source might be flagged as a suspicious port-scanner if it sends packages to a lot of destinations in an IP traffic network; an IP address might be under the DDoS (distributed denial-of-service) attack if it receives packages from many different sources; a person is flagged as 'extremely multi-disciplinary' if s/he publishes papers in many remotely related fields in an author-conference network; in certain collusion-type of fraud in a financial transaction network, a group of users always gives good ratings to another group of users in order to artificially boost the reputation of the target group, etc. If such behaviors/activities (e.g., 'sends/receives packages', 'publishes papers', 'gives good ratings', etc) are mapped to the language of matrix factorization, it also suggests that the corresponding entries in the residual matrix R should be non-negative.

In response to such challenges, the present invention may provide a new matrix factorization (NrMF) for the task of graph anomaly detection. The present invention is the first to address the interpretation issue of matrix factorization for the purpose of graph anomaly detection. Some of the major contributions of the present invention may include:

1. Problem formulation, presenting a new formulation for matrix factorization (NrMF) tailored for graph anomaly detection;

2. An effective algorithm (AltQP-Inc) to solve the above optimization problem, linear with respect to the size of the graph;

3. Proofs and analysis, showing the effectiveness as well as the efficiency of the proposed method;

4. Experimental evaluations, demonstrating both the effectiveness and efficiency of the proposed method.

Problem Definitions

TABLE 1

| Symbols | |
|---|---|
| Symbol | Definition and Description |
| A, B, ... | matrices (bold upper case) |
| A(i, j) | the element at the $i^{th}$ row and $j^{th}$ column of matrix A |
| A(i, :) | the $i^{th}$ row of matrix A |
| A(:, j) | the $j^{th}$ column of matrix A |
| A' | transpose of matrix A |
| a, b, ... | column vectors (bold lower case) |
| F, G | factorized matrices of A |
| R | residual matrix of A |
| n | number of type 1 objects in A |
| l | number of type 2 objects in A |
| m | number of edges in A |
| r | rank size |

Table 1 lists the main symbols which may be used to describe the present invention. An exemplary aspect of the present invention may involve the most general case of bipartite graphs. A general bipartite graph may be represented herein by its adjacency matrix (In practice, these matrices may be stored using an adjacency list representation, since real graphs are often very sparse).

Following the standard notation, capital bold letters may be used herein for matrices (e.g., A), lower case bold letters for vectors (e.g., a). The transpose may be denoted with a prime (i.e., A' is the transpose of A). Subscripts may be used to denote the size of matrices/vectors (e.g., $A_{n \times l}$ means a matrix of size n×l). When the size of a matrix or a vector is clear from the context, such subscripts may be ignored for brevity. Also, the elements in a matrix may be represented herein by using a convention similar to Matlab, e.g., A (i,j) is the element at the $i^{th}$ row and $j^{th}$ column of the matrix A, and A(:,j) is the $j^{th}$ column of A, etc.

With the above notations, a general matrix factorization problem can be formally defined as PROBLEM 1. Matrix Factorization Given: A graph $A_{n \times l}$, and the rank size r;

Find: Its low-rank approximation structure. That is, find (1) two factorized matrices $F_{n \times r}$ and $G_{r \times l}$, and the residual matrix $R_{n \times l}$; such that (1) $A_{n \times l} \approx F_{n \times r} G_{r \times l}$, and (2) $R_{n \times l} = A_{n \times l} - F_{n \times r} G_{r \times l}$.

follows:

Existing matrix factorization techniques can be viewed as different instantiations of Problem 1. They differ from each other, mainly from the following two aspects: (1) by using the different metrics to measure the approximation accuracy (some norms on the residual matrix R); and (2) by imposing the different constraints on the factorized matrices F and G. For example, non-negative matrix factorization requires the factorized matrices to be non-negative.

Another instantiation of Problem 1 may be presented by imposing the non-negativity constrains on the residual matrix R. This problem, Non-Negative Residual Matrix Factorization (NrMF), is formally defined as follows:

PROBLEM 2. Non-Negative Residual Matrix Factorization (NrMF)

Given: A graph $A_{n \times l}$, and the rank size r;

Find: Its low-rank approximation structure. That is, find two factorized matrices $F_{n \times r}$ and $G_{r \times l}$, and the residual matrix $R_{n \times l}$; such that (1) $A_{n \times l} \approx F_{n \times r} G_{r \times l}$; (2) $R_{n \times l} = A_{n \times l} - F_{n \times r} G_{r \times l}$; and (3) for all $A(i,j)>0$, $R(i,j) \geq 0$.

Problem 2 is tailored for the task of graph anomaly detection, where the corresponding elements R (i, j) are explicitly required in the residual matrix R to be non-negative if there exists an edge between node i and node j in the original graph (i.e., A (i, j)>0). As explained earlier, the residual matrix R is often a good indicator for anomalies on graphs. Moreover, many abnormal behaviors/activities (e.g., port-scanner, DDoS, etc) can be mapped to some non-negative entries in the residual matrix R. For instance, a large entry in R might indicate a strange interaction between two objects; a heavy row/column of R might indicate a suspicious object (e.g., port-scanner, or an IP ad-dress that is under DDoS attack, etc). In NrMF, the present invention may aim to capture such abnormal behaviors/activities by explicitly imposing non-negativity constrains on the residual matrix R. Moreover, NrMF directly brings the non-negativity, an interpretation-friendly property, to the task of graph anomaly detection since negative values are usually hard to interpret. For example, by existing matrix factorization methods, the data analyst has to look at (somewhat abstract) residual matrix, which contains both positive and negative entries, and calculate the re-construction errors to spot anomalies. In contrast, thanks to the non-negativity constraints in NrMF, the residual matrix itself can be presented as a residual graph, which might be more intuitive for the data analyst to interpret.

The Proposed Solutions for NrMF

Optimization Formulations

Formally, Problem 2 can be formulated as the following optimization problem:

$$\mathrm{argmin}_{F,G} = \|R_{n \times l} \otimes W_{n \times l}\|_F^2 \quad (3.1)$$
$$= \sum_{i=1}^{n} \sum_{j=1}^{l} (A(i, j) - F(i, :)G(:, j))^2 W(i, j)^2$$
$$\text{s.t. for all } A(i, j) > 0:$$
$$F(i, :)G(:, j) \leq A(i, j)$$

In eq. (3.1), ⊗ means element-wise multiplication. In other words, a weighted squared Frobenius norm of the residual matrix R is used to measure the approximation accuracy, through a weight matrix $W_{n \times l}$. For every edge in the graph (i.e., A (i, j)>0), we require that $F(i, :)G(:,j) \leq A$ (i,j), which means that the corresponding residual entry R(i, j) should satisfy that $R(i,j)=A(i,j)-F(i, :)G(:,j) \geq 0$.

0/1 Weight Matrix for Eq. (3.1)

In eq. (3.1), the weight matrix W reflects the user's preference among all n×l reconstructed entries. An exemplary aspect of the present invention may focus on a special case of weight matrix W: W(i,j)=1 for A(i,j)>0; and W(i,j)=0 otherwise. This means that the exemplary aspect of the present invention may only measure the element-wise loss on the observed edges; and among all these edges, the element-wise loss is treated equally (referred to as '0/1 Weight Matrix'). This type of weight matrix is widely used in the conventional methods, especially in the context of collaborative filtering.

With such 0/1 weight matrix, eq. (3.1) can be simplified as:

$$\mathrm{argmin}_{F,G} \sum_{i,j,A(i,j)>0} (A(i, j) - F(i, :)G(:, j))^2 \quad (3.2)$$
$$\text{s.t. for all } A(i, j) > 0:$$
$$F(i, :)G(:, j) \leq A(i, j)$$

The present invention will be described herein by focusing on eq. (3.2) for clarity. However, the proposed techniques can be naturally applied to a general, arbitrary weight matrix W.

Rank-1 Approximation for Eq. (3.2)

In eq. (3.2), if the rank of the factorized matrices F and G is restricted to be 1, the following rank-1 approximation of eq. (3.2) is provided, where f is an n×1 column vector and g is a 1×l row vector.

$$\mathrm{argmin}_{f,g} \sum_{i,j,A(i,j)>0} (A(i, j) - f(i)g(j))^2 \quad (3.3)$$
$$\text{s.t. for all } A(i, j) > 0:$$
$$f(i)g(j) \leq A(i, j)$$

The Proposed Optimization Algorithms

Challenges

Unfortunately, the optimization problem formulated in eq. (3.2) is not convex with respect to F and G jointly due to the coupling between F and G in both the objective function and the inequality constraints. Therefore, it might be unrealistic to seek for a global optimal solution. A natural way to handle this issue is to find F and G alternatively. Actually, it can be shown that if either G or F is fixed in (3.2), the resulting optimization problem is a convex quadratic programming problem with respect to the remaining matrix (For G). This suggests the following greedy optimization strategy (referred to as AltQP-Batch: after some initialization, F and G are alternatively updated using convex quadratic programming until convergence. With AltQP-Batch, a local minimal solution can be found for eq. (3.2), which is acceptable in terms of optimization quality for a non-convex problem. However, most, if not all, of existing convex quadratic programming methods are polynomial with respect to the number of variables. This makes the overall complexity of AltQP-Batch to be polynomial, which might not scale very well for large graphs.

To address these challenges, the present invention may provide an effective and efficient algorithm AltQP-Inc. The basic idea of AltQP-Inc is to find the resulting F and G incrementally: at each iteration, the present invention may try to find a rank-1 approximation on the current residual matrix by solving eq. (3.3). This strategy bears the similar greedy nature as AltQPBatch. Therefore, the strategy also leads to a local minimal solution for eq. (3.2), yet its time complexity is linear with respect to the size of the graph, which makes the algorithm more suitable for large graphs.

AltQP-Inc-1: Proposed Algorithm for Eq. (3.3)

Again, eq. (3.3) is not convex with respect to f and g jointly due to the coupling between f and g. Therefore, the present invention may provide an alternative strategy: the algorithm alternatively iterates as follows until convergence: (1) updating f while keeping g fixed; and (2) updating g while keeping f fixed.

Formally, let us consider how to update g while keeping f fixed (updating f is similar as updating g). In this case, eq. (3.3) can be further simplified as:

$$\operatorname{argmin}_g \sum_{i,j, A(i,j)>0} (A(i,j) - f(i)g(j))^2 \quad (3.4)$$

$$\text{s.t.} \quad \text{for all } A(i,j) > 0:$$

$$f(i)g(j) \le A(i,j)$$

It is easy to show that eq. (3.4) is convex with respect to g. The proposed algorithm (Update-g) for solving eq. (3.4) is summarized in Algorithm 1.

---
Algorithm 1 Update-g (For Solving e.q. 3.4)
---
Input: The original matrix $A_{n \times l}$; and a column vector $f_{n \times 1}$
Output: A row vector $g_{1 \times l}$
1:  for j = 1 : l do
2:    Initialize the lower bound low = −inf, upper bound up = inf, t = 0 and q = 0;
3:    for each i, s.t.. A(i, j) > 0 do
4:      Update: q ← q + f(i)A(i, j)
5:      Update: t ← t + f(i)²
6:      if f(i) > 0 then
7:        Update: up = min(up, A(i, j)/f(i))
8:      else if f(i) < 0 then
9:        Update: low = max(low, A(i, j)/f(i))
10:     else
11:       Continue;
12:     end if
13:   end for
14:   if t == 0 then
15:     Set: g(j) = 0;
16:     Continue;
17:   end if
18:   Set: q ← q/t
19:   if q <= up and q >= low then
20:     Output: g(j) = q;
21:   else if q > up then
22:     Output: g(j) = up;
23:   else
24:     Output: g(j) = low;
25:   end if
26: end for
---

At each outer loop of Algorithm 1, the present invention may update a single entry g(j) (j=1, . . . , l), which is in turn done by some closed formula (steps 19-25 in Algorithm 1). The main difference between Update-g and AltQP-Batch is as follows: in Update-g, g is a row vector and a computationally cheap closed formula may be used to solve eq. (3.4). In contrast, some expensive convex quadratic programming packages may need to be called in AltQP-Batch to find the optimal solution.

Based on Algorithm 1, Algorithm 2 (Rank-1-Approximation) may be used to solve eq. (3.3): after some initializations (step 1).

---
Algorithm 2 Rank-1-Approximation (For Solving e.q. 3.3)
---
Input: The original matrix $A_{n \times l}$
Output: A column vector $f_{n \times 1}$; and a row vector $g_{1 \times l}$;
1:  Initialize $f_{n \times 1}$ and $g_{1 \times l}$;
2:  while Not convergent do
3:    Update: g ← Update-g(A, f)
4:    Set: f' ← Update-g(A', g')
5:    Update: f = f'
6:  end while
---

Algorithm 2 alternates between the following two steps until convergence: (1) update g while keeping f fixed by calling Update-g (step 3); and (2) update f while keeping g fixed by calling Update-g (step 4).

AltQP-Inc: Proposed Algorithm for Eq. (3.2)

Based on Algorithm 2, the Algorithm AltQP-Inc for solving the original eq. (3.2) is summarized in Algorithm 3.

---
Algorithm 3 AltQP-Inc (For Solving e.q. 3.2)
---
Input: The original matrix $A_{n \times l}$, and rank size r
Output: An n × l matrix F: a r × l matrix G; and an n × l matrix R
1:  Initialize F = $0_{n \times r}$, G = $0_{r \times l}$, and R = A
2:  for k = 1 : r do
3:    (f, g) ← Rank-1-Approximation(R)
4:    Set F(:, k) = f, and G(k, :) = g
5:    for every (i, j), s.t., A(i, j) > 0 do
6:      Update R(i, j) ← R(i, j) − f(i)g(j)
7:    end for
8:  end for
---

Algorithm 3 is an incremental algorithm: at each iteration, Algorithm 3 calls Algorithm 2 to find a rank-1 approximation for the current residual matrix R (steps 3-4). It should be noted that since eq. (3.2) is an instantiation of eq. (3.1) by using the 0/1 weight matrix, the residual entries only need to be updated where there exists an edge in the original graph (i.e., A(i, j)>0) in steps 5-7.

Analysis of the Proposed Algorithms

Effectiveness of the Proposed Algorithms

The effectiveness of the proposed algorithms is summarized in Lemma 4.1, which basically says that the proposed AltQPInc finds a local minima of eq. (3.2). Given that the optimization problem in eq. (3.2) is not convex with respect to F and G jointly, such a local minima is acceptable in terms of the optimization quality.

LEMMA 4.1. Effectiveness. (P1) Update-g in Alg. 1 gives the global optimal solution for the optimization problem in e.q. (3.4); (P2) Rank-1 Approximation in Alg. 2 finds a local minima of the optimization problem in e.q. (3.3); and (P3) AltQP-Inc in Alg. 3 finds a local minima for the optimization problem in e.q. (3.2).

Sketch of Proof:

For brevity, only the proof for (P1) is given; since (P2) and (P3) are relatively straight-forward based on (P1).

Here, the key point is that eq. (3.4) can be decomposed into the following/independent optimization problems, each of which only involves a single variable g(j) (j=1, . . . , l):

$$\text{For} \quad j = 1, \ldots, l: \quad (4.5)$$

$$\operatorname{argmin}_{g_j} \sum_{i, A(i,j)>0} (A(i,j) - f(i)g(j))^2$$

-continued $$\text{s.t. for all } A(i, j) > 0:$$
$$f(i)g(j) \leq A(i, j)$$

For a given j, e.q. (4.5) is equivalent to[2]:

$$\operatorname{argmin}_{g(j)} \quad g(j)^2 - 2qg(j) \qquad (4.6)$$
$$\text{s.t.} \quad \text{low} \leq g(j) \leq \text{up}$$
$$\text{where:} \quad q = \left(\sum_{i, A(i,j)>0} f(i)A(i,j)\right) \Big/ \left(\sum_{i, A(i,j)>0} f(i)^2\right)$$
$$\text{low} = \max_{f(i)<0, A(i,j)>0} \{A(i,j)/f(i)\}$$
$$\text{up} = \max_{f(i)>0, A(i,j)>0} \{A(i,j)/f(i)\}$$

(It should be noted that a constant term has been dropped from the objective function since it does not affect the optimal solution).

In eq. (4.6), a quadratic objective function is provided with respect to a single variable g(j), where g(j) has a boundary constraint (low≤g(j)≤up). It is easy to verify that each outer loop of Algorithm 1 gives the global optimal solution for eq. (4.6). Therefore, the whole Algorithm 1 gives the global optimal solution for eq. (3.4), which completes the proof. □

Time Efficiency of the Proposed Algorithms

The time complexity of the proposed algorithms is summarized in Lemma 4.2, which basically says that for all the three algorithms proposed in the exemplary aspects of the present invention, the algorithms are linear with respect to the size of graph m, n and l. Therefore, all of the algorithms (Algorithms 1, 2 and 3) are scalable for large graphs.

LEMMA 4.2. Time Complexity. (P1) Update-g in Alg. 1 requires O(m+l) time; (P2) Rank-1-Approximation in Alg. 2 requires O(mt+nt+lt) time; and (P3) AltQP-Inc in Alg. 3 requires O(nrt+mrt+lrt) time, where t is the maximum iteration number in Alg. 2.

Proof of P1: The time cost for step 2 of Alg 1 is O(1). Let $m_j$ be the total number of non-zero elements in the $j^{th}$ column of matrix A. we have $\Sigma_{j=1}^{l} m_j = m$. The time cost for step 3 and 13 is $O(m_j)$ since we need O(1) operations for each non-zero element in A(:,j). The cost for steps 14-17 is O(1). We need another O(1) time for step 18. Finally, for steps 19-25, we need O(1) time. Therefore, the total cost for Alg. 1 is $\Sigma_{j=1}^{l} (O(1)+O(m_j))=O(l)+O(\Sigma_{j=1}^{l} m_j)=O(m+l)$, which completes the proof. □

Proof of P2: Step 1 in Alg. 2 takes O(l+n) time. Based on (P1), we need O(m+l) and O(m+n) for step 3 and 4, respectively. We need another O(n) for step 5. Therefore, the overall time complexity of Alg. 2 is O(l+n)+(O(m+l)+O(m+n)+O(n))t=O(mt+nt+lt), which completes the proof. □

Proof of P3: Step 1 in Alg. 3 takes O(nr+lr+m) time. Let $\tilde{m}_k$ be the number of non-zeros elements in R in the $k^{th}$ iteration of Alg. 3, we have that $\tilde{m}_l = m$ and $\tilde{m}_k \leq m$ (k=2, ..., r). Based on (P2), we need $O(\tilde{m}_k t+nt+lt)$ for step 3. For step 4, we need O(n+l) time. We need additional O(m) time for updating R (steps 5-7). Putting these together, the overall time complexity of Alg. 3 is $O(nr+lr+m)+\Sigma_{k=1}^{r} O(\tilde{m}_k t+nt+lt+m+n+l)=O(mrt+nrt+lrt)$, which completes the proof. □

Space Efficiency of the Proposed Algorithms

The space complexity of the proposed algorithms is summarized in Lemma 4.3, which basically says that for all the three algorithms proposed (i.e., Algorithms 1, 2 and 3), the space complexity is linear with respect to the size of graph m, n and l. Therefore, the Algorithms 1, 2 and 3 are scalable for large graphs.

LEMMA 4.3. Space Complexity. (P1) Update-g in Alg. 1 requires O(m+n+l) space; (P2) Rank-1-Approximation in Alg. 2 requires O(m+n+l) space; and (P3) AltQP-Inc in Alg. 3 requires O(m+nr+lr) space.

Proof of P1: In Alg. 1, we need O(m), O(n), and O(l) space to keep the original matrix A, the column vector f, and the row vector g, respectively. For all the remaining steps in Alg. 1, they requires O(l) space respectively. Among the different iterations of Alg. 1, we can re-use the space from the previous iteration. Therefore, the overall space complexity of Alg. 1 is O(m+n+l), which completes the proof. □

Proof of P2: In Alg. 2, we need O(m) space for the original matrix A. The initialization in step 1 needs O(n+l) space. By (P1), we need O(m+n+l) space for steps 3-4, respectively. Step 5 tasks another O(n) space. Among the different iterations of Alg. 1, we can re-use the space from the previous iteration. Therefore, the overall space complexity of Alg. 2 is O(m)+O(n+l)+O(2m+2n+2l)+O(n)=O(m+n+l), which completes the proof.□

Proof of P3: In Alg. 3, we need O(m) space for the original matrix A. The initialization in step 1 needs O(nr+lr+m) space. Let $\tilde{m}_k$ be the number of non-zeros elements in R its the $k^{th}$ iteration, we have that $\tilde{m}_l = m$ and $\tilde{m}_k \leq m$ (k=2, ..., r). Based on (P2), we need $O(m_k+n+l)$ for step 3. For steps 4-7, they do not require extra space. Finally, among different iterations, we can reuse the space from the first iteration since $\tilde{m}_k \leq \tilde{m}_l = m (k=1, ..., r)$. Therefore, the overall space complexity of Alg. 3 is $O(m)+O(nr+lr+m)+O(\max(m_l)+n+l)=O(m+nr+lr)$, which completes the proof. □

Experimental Results

The inventors have demonstrated the effectiveness and efficiency of the present invention by experimental evaluations, after we introduce the data sets. All of the experiments were designed to answer the following two questions:

Effectiveness: What kinds of anomalies can the proposed AltQP-Inc detect?

Efficiency: How fast is the proposed AltQP-Inc, and how does it scale?

Data Sets

Four different data sets were used in the experiments conducted by the inventors. The results of these experiments are summarized in Table 2.

TABLE 2

Data sets used in evaluations

| Name | n × l | m |
| --- | --- | --- |
| MIT-DP | 103 × 97 | 5,449 |
| NIPS-PW | 2,037 × 13,649 | 1,624,335 |
| CIKM-PA | 1,895 × 952 | 2,664 |
| MovieLens | 6,040 × 3,952 | 575,281 |

The first data set (MIT-DP) is from the MIT Reality Mining project. Rows represent the blue tooth devices and columns represent the persons. The unweighted edges represent the scanning activities between the devices and persons. In total, there are 103 devices, 97 persons and 5,449 scanning activities.

NIPS-PW is from the NIPS proceedings. Rows represent papers and columns represent words. Weighted edges represent the count of the words that appear in the corresponding papers. In total, there are 2,037 authors, 13,649 words, and 1,624,335 edges.

CIKM-PA is an author-paper graph constructed from CIKM proceedings. Rows represent the authors and columns represent the papers. A given paper is connected with all of its co-authors by edges. In total, there are 1,895 authors, 952 papers and 2,664 edges.

MovieLens is a user-movie rating graph. Rows represent users and columns represent movies. If a user has give a positive rating (4 or 5) to a particular movie, we connect them with an edge. Here, the edge weight is the actual rating (4 or 5). In total, we have 6,040 users, 3,952 movies, and 575,281 edges.

Effectiveness Results

The exemplary aspects of the present invention may focus on the following four types of anomalies on bipartite graphs:

1. Strange connection (referred to as 'strange connection'). This is a connection between two nodes which belong to two remotely connected communities, respectively. For example, in author-conference graph, this could be the case in which an author publishes a paper in a conference which is remotely related to his/her major research interest (e.g., a system guy publishes a paper in a theory conference, etc).

2. Port-scanning like behavior (referred to as 'port-scan'). This is a type-1 node that is connected to many different type-2 nodes in the bipartite graph. For example, in an IP traffic network, this could be an IP source which sends packages to many different IP destinations (therefore, the IP source might be a suspicious port scanner).

3. DDoS like behavior (referred to as 'ddos'). This is a type-2 node that is connected to many different type-1 nodes in the bipartite graph. For example, in an IP traffic network, this could be an IP destination which receives packages from many different IP sources (therefore, the IP destination might be under DDoS, distributed denial-of-service, attack).

4. Collusion type of fraud (referred to as 'bipartite core'). This is a group of type-1 nodes and a group of type-2 nodes which are tightly connected with each other. For example, in a financial transaction network, this could be a group of users who always give good ratings to another group of users in order to artificially boost the reputation of the target group.

Since the ground-truth for the anomalies is not available, the following methodology was used for evaluation: randomly inject one of the above anomalies into the original (normal) graph, and see if the proposed algorithm can spot it from the top-k edges of the residual matrix R.

Qualitative Results. Since the residual elements in R by the proposed AltQP-Inc are non-negative, the residual R itself can be plotted as a residual graph as follows. The residual graph has the same node sets as the original graph A. For each edge (i,j) in A (i.e., A(i,j)>0), an edge is placed between node i and node j in the residual graph if R(i, j)>0 with the weight R(i, j). Compared with the traditional matrix factorization methods (where one has to calculate and look at the abstract re-construction error for anomalies), the residual graph might provide a more intuitive way to spot anomalies on graphs.

Figure 3A:
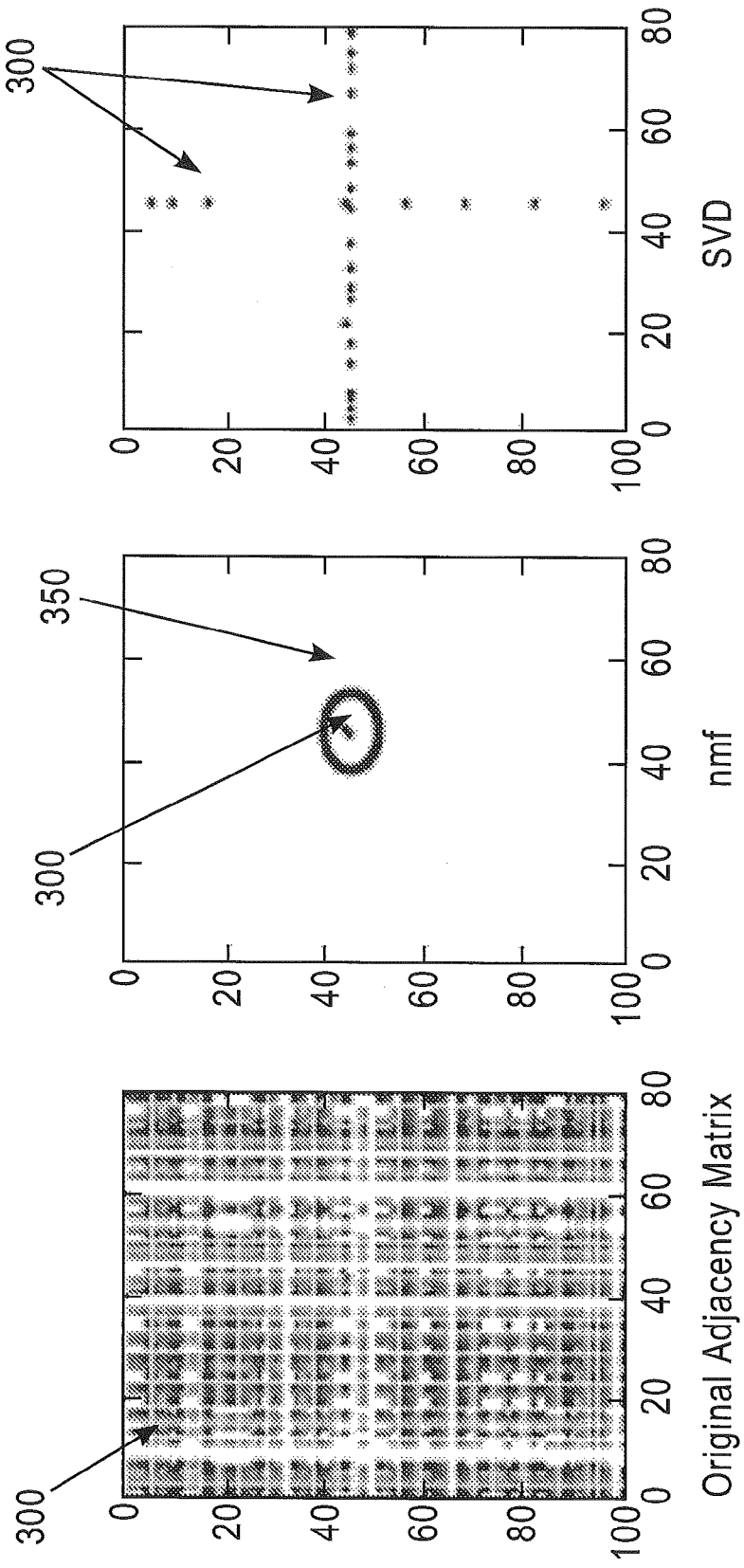
FIGS. 3A-3D illustrate anomaly detection on synthetic graphs, in accordance with an exemplary aspect of the present invention.
Figure 3B:
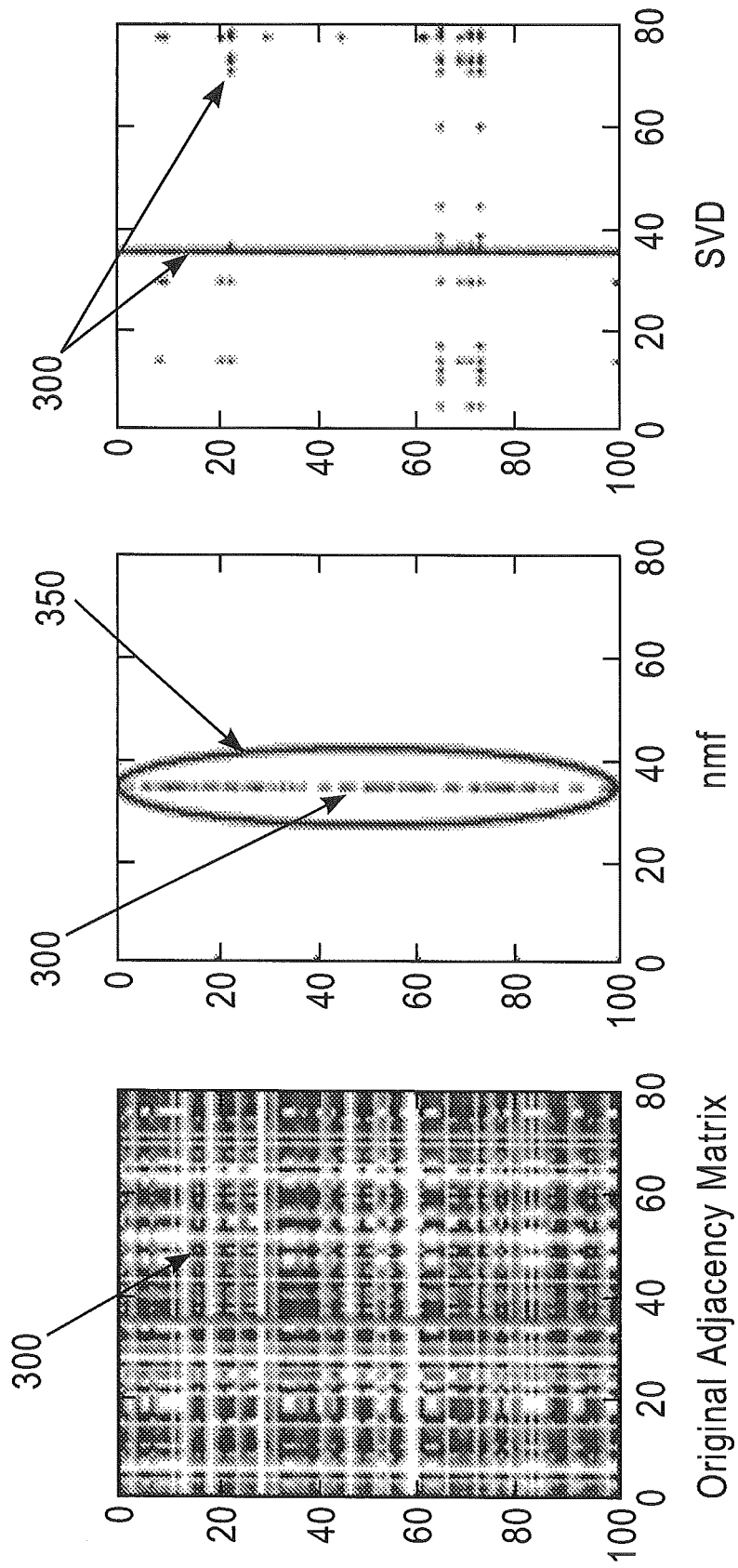
Figure 3C:
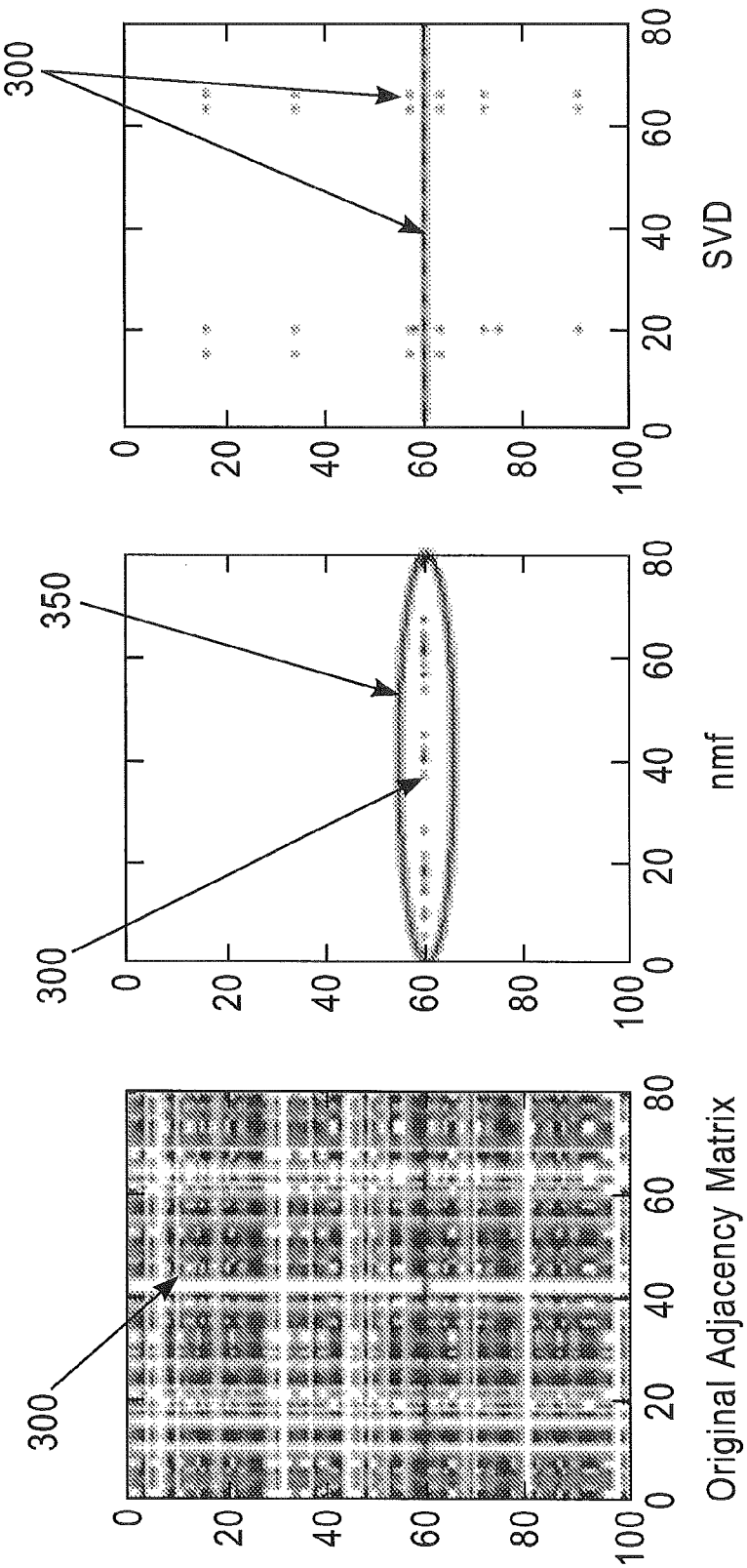
Figure 3D:
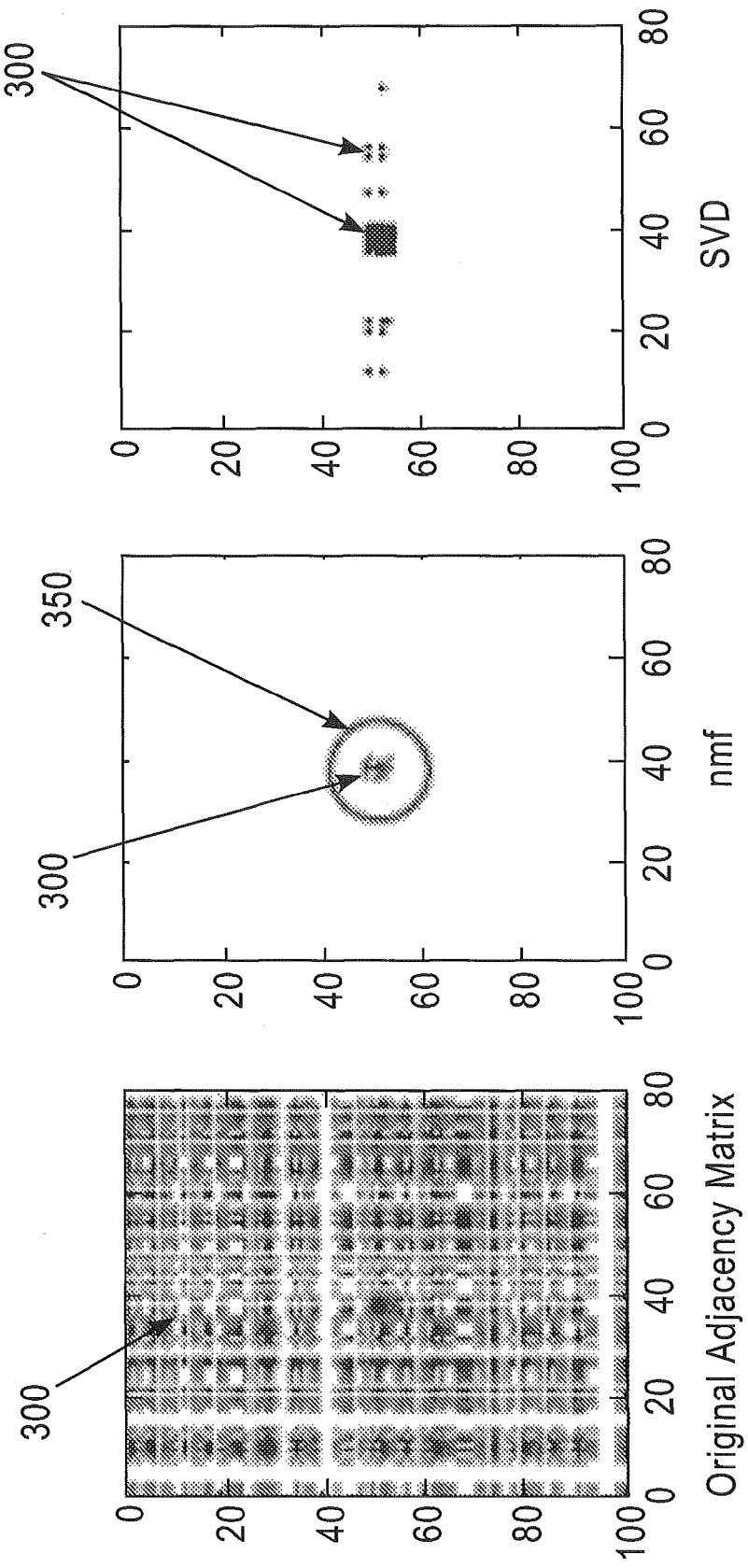

FIGS. 3A-3D illustrate anomaly detection on synthetic graphs. In particular, FIG. 3A is a graph for a strange connection, FIG. 3B is a graph for a port scanning, FIG. 3C is a graph for a ddos, and FIG. 3D is a graph for a bipartite core.

Each dot 300 in FIGS. 3A-3D represents an edge (or non-zero elements) in the graph or in the residual matrices. The anomalies detected by the proposed AltQP-Inc are marked by circles (e.g., ellipses) 350 in FIGS. 3A-3D.

For each sub-figure, one of the four anomalies is injected into the normal graphs, and the original matrix (left), the top-k edges in the residual matrix by AltQP-Inc (middle) and the residual matrix by singular value decomposition (SVD) (right) are plotted. It can be seen that in all cases, the corresponding anomalies clearly stand out in the corresponding residual matrix by the proposed AltQPInc (middle figures). On the other hand, (1) SVD does not always capture the corresponding anomalies (e.g., FIG. 3A), and/or (2) there might be some noise in the residual matrix by SVD (e.g., FIGS. 3B-3D). In addition, since the residual entries in SVD can be both positive and negative, the residual matrix cannot be plotted by SVD as an intuitive residual graph.

Figure 4:
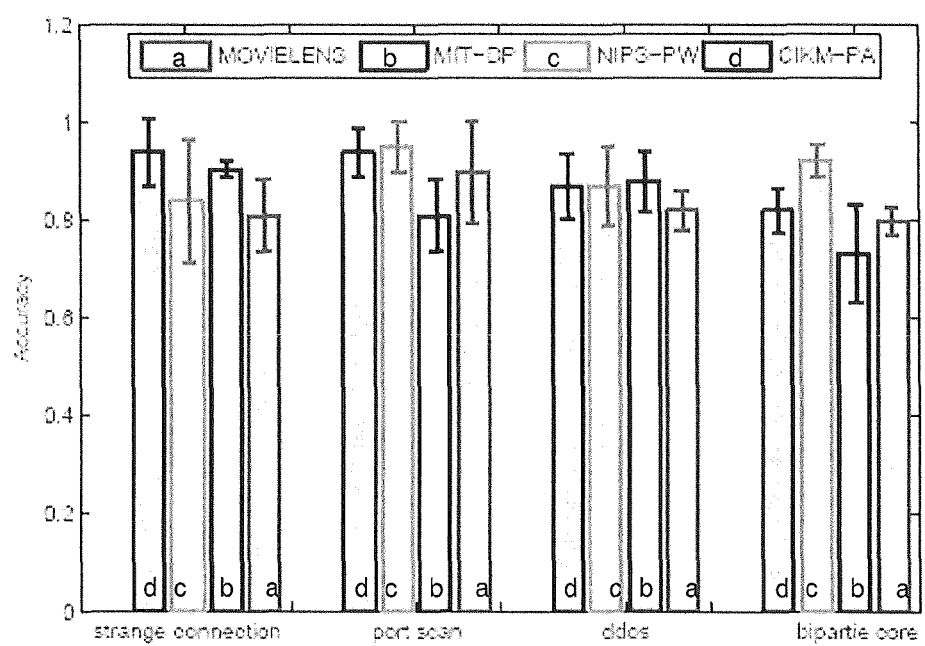
FIG. 4 illustrates the quantitative results on the four real data sets (i.e., movie lens (a), MIT-DP (b), NIPS-PW (c) and CIKM-PA (d)), in accordance with an exemplary aspect of the present invention.

FIG. 4 illustrates the quantitative results on the four real data sets (i.e., movie lens (a), MIT-DP (b), NIPS-PW (c) and CIKM-PA (d)). In particular, FIG. 4 illustrates anomaly detection on real graphs by the proposed AltQP-Inc. For each data set, one of the four anomalies is randomly injected into the data set. The proposed AltQP-Inc is then run to find the residual matrix and output its top-k edges as anomalies. Each of such experiments was repeated 20 times and the mean accuracy and variance is illustrated in FIG. 2. It can be seen in FIG. 4 that Alt QP-Inc achieves high detection accuracy for all the four types of anomalies (e.g., strange connection, port scanning, ddos and bipartite core), across all the four data sets (a-d).

Efficiency Results

The inventors have evaluated the efficiency of the proposed AltQP-Inc. The results reported in this subsection are tested on the same machine with four 3.0 GHz Intel® Xeon® CPUs and 16 GB memory, running Linux (2.6 kernel). The experiments were repeated 10 times and the mean wall-clock time was reported.

Figure 5:
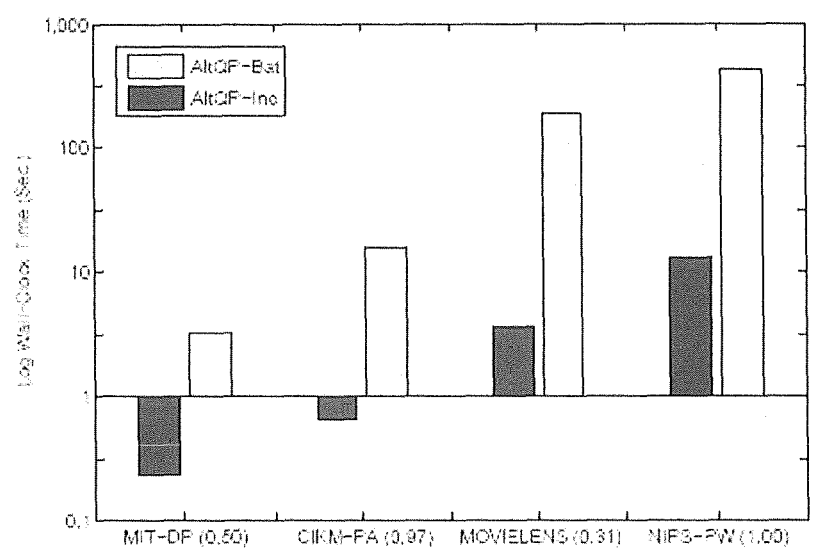
FIG. 5 illustrates the comparison of the wall-clock time for the four real data sets (i.e., movie lens, MIT-DP, NIPS-PW and CIKM-PA), in accordance with an exemplary aspect of the present invention.

First, the wall-clock time is compared between the proposed AltQP-Inc and AltQP-Batch (described in detail below). FIG. 5 illustrates the comparison of the wall-clock time for the four real data sets (i.e., movie lens, MIT-DP, NIPS-PW and CIKM-PA).

In FIG. 5, the number inside the parentheses beside the name of the data sets, is the ratio between the re-construction error by AltQP-Inc and that by AltQP-Batch. It can be seen that the proposed AltQP-Inc is much faster than AltQP-Batch. For example, AltQP-Inc is 51 times faster (3.6 sec. vs. 1 86 sec.) than AltQP-Batch on MovieLens data set. Note that the ratio between the re-construction error by AltQPInc and that by AltQP-Batch is always less than or equal to 1, indicating that the optimization solution by AltQP-Inc is better than (MIT-DP and MovieLens) or similar to (NIPSPW and CIKM-PA) that by AltQP-Batch.

Figure 6A:
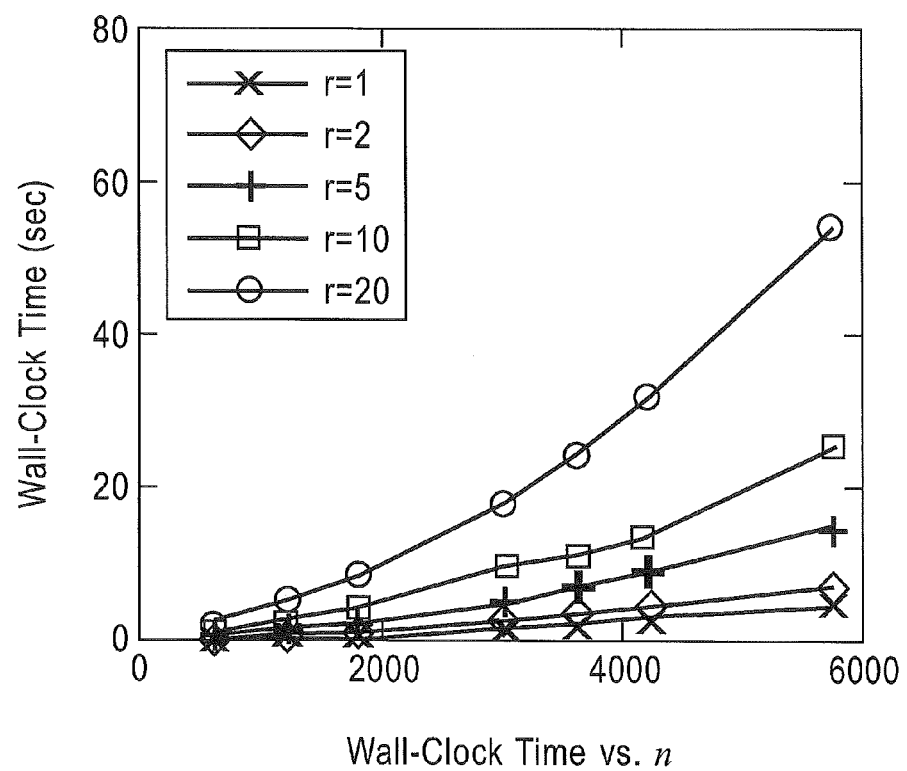
FIGS. 6A-6C illustrate wall-clock time vs. n, wall-clock time vs. l, and wall-clock time vs. m, respectively, in accordance with an exemplary aspect of the present invention.
Figure 6B:
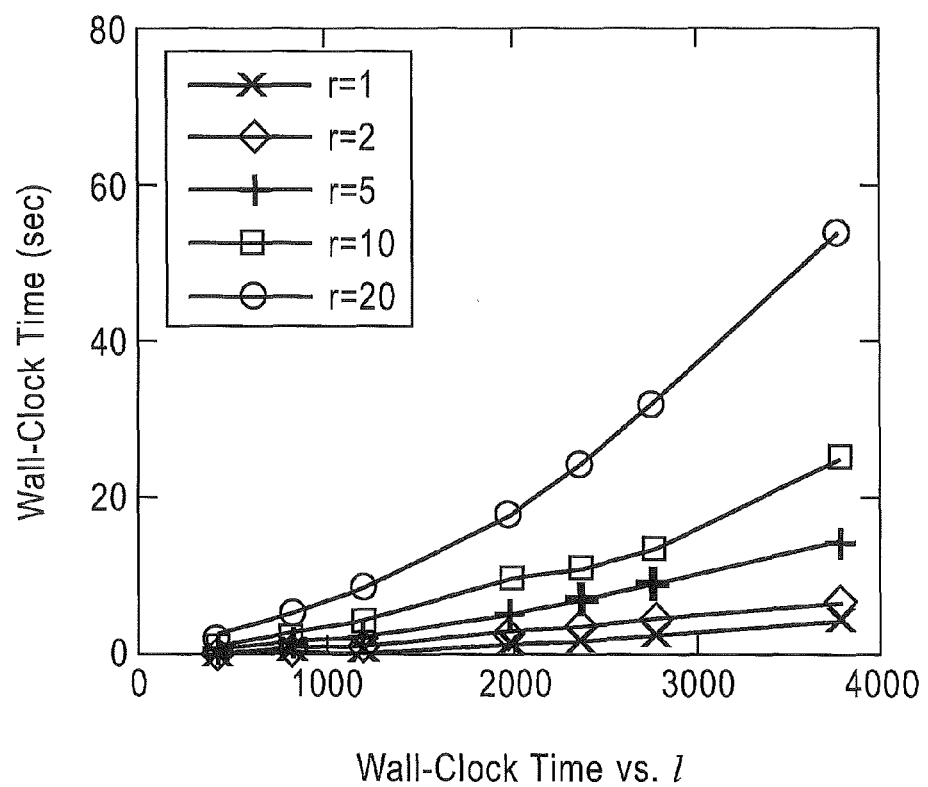
Figure 6C:
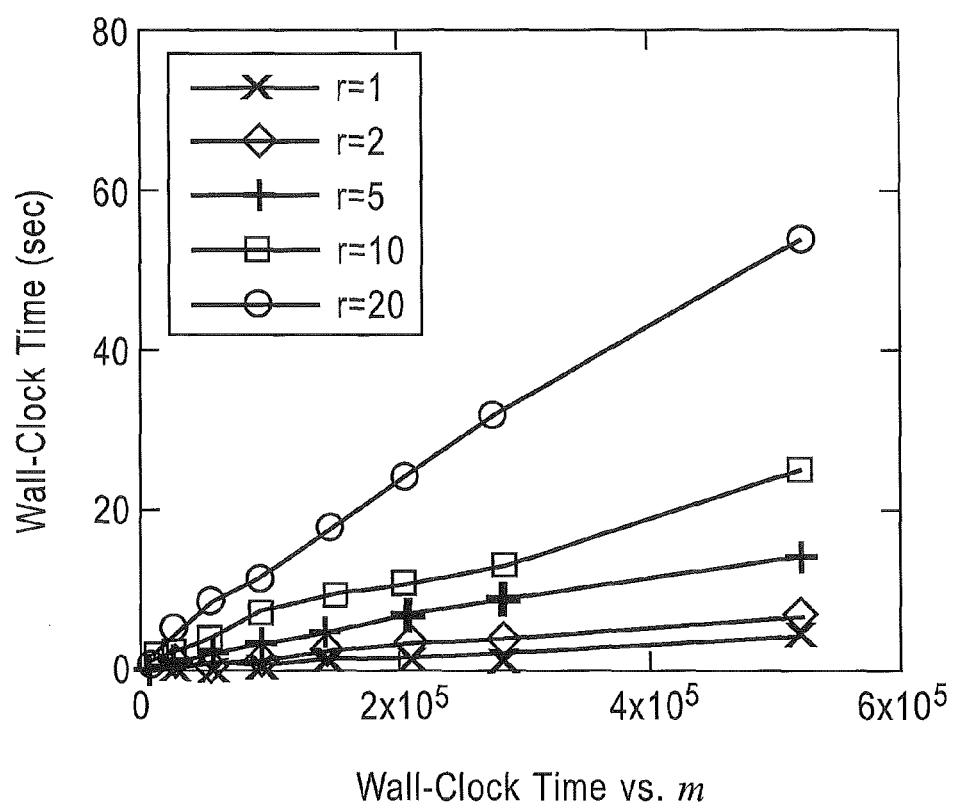

Next, the scalability of AltQP-Inc was tested using the subsets of the MovieLens data set with the different rank size r. FIGS. 6A-6C illustrate the results of the tests on the scalability of AltQP-Inc. with different rank size r (e.g., r=1, r=2, r=5, r=10 and r=20). In particular, FIG. 6A illustrates wall-clock time vs. n, FIG. 6B illustrates wall-clock time vs. l, and FIG. 6C illustrates wall-clock time vs. m. It can be seen that the proposed AltQP-Inc scales linearly with respect to the graph size (n, l and m).

In summary, the present invention may present a novel matrix factorization (NrMF) paradigm, which aims to detect abnormal behaviors/activities on graphs in a more interpretable way. Some of the novel aspects of the present invention may include:

1. Problem formulation, presenting a new formulation for matrix factorization tailored for graph anomaly detection;

2. An effective algorithm (AltQP-Inc) to solve the above optimization problem, linear with respect to the size of the graph;

3. Proofs and analysis, showing the effectiveness as well as the efficiency of the proposed method according to an exemplary aspect of the present invention (e.g., Lemma 4.1, Lemma 4.2, etc);

4. Experimental evaluations, demonstrating both the effectiveness and efficiency of the proposed method according to an exemplary aspect of the present invention.

Further, the invention may also include extending AltQPInc to time-evolving graphs, and parallelizing AltQP-Inc using Hadoop.

Further, the present invention may have many practical applications. For example, the present invention may be used to detect anomalies in large bi-partite graphs in Social Network Analysis (e.g., given a people-people graph, find misbehavioral persons), HealthCare (e.g., given a patient-physician graph, or a patient-treatment graph, find strange patient, compromised physicians, etc.), Crime Prevention (e.g., given an incident-people-gang graph, find new criminal trend, find potential suspects, etc.), Financial Fraud Detection (e.g., given a transaction graph, or a institute/people-transaction graph, find abnormal transactions, scammers), Cyber-security (e.g., given an IP-traffic graph, find port scanner, find vulnerable Ws, etc.).

In short, the present invention provides a method and system for managing a large size of graph, that is efficient in both storage cost and on-line query, and has broad applicability.

Algorithms of Other Exemplary Aspects of the Present Invention

The present invention is described above by focusing on the optimization problem in eq. (3.2), and restricted to the 0/1 weight matrix. However, other exemplary aspects of the present invention may provide algorithms for solving the optimization problem in eq. (3.1) with a general weight matrix W for the purpose of completeness. That is, the proposed AltQP-Inc may be generalized to handle the general weight matrix W (AltQP-Inc-General), and the alternative optimization algorithm (AltQP-Batch) may be given for solving eq. (3.1), using convex quadratic programming.

Generalized AltQP-Inc for Eq. (3.1)

In order to generalize the proposed Alt QP-Inc to solve eq. (3.1) with a general weight matrix W, Algorithm 4 (Update-General-g) is first given to solve the sub-problem expressed in eq. (1.7).

Algorithm 4 Update-General-g (For Solving e.q. 1.7)

Input: The original matrix $A_{n \times l}$, the weight matrix $W_{n \times l}$, and a column vector $f_{n \times 1}$
Output: A row vector $g_{1 \times l}$
1: for j = 1 : l do
2:    Initialize the lower bound low = −inf and upper bound up = inf;
3:    Compute: a = diag(W(:, j)) · A(:, j)
4:    Compute: b = diag(W(:, j)) · f
5:    Compute: t = b'b
6:    if t == 0 then
7:        Set: g(j) = 0;
8:        Continue;
9:    end if
10:   Compute: q = a'b/t
11:   for each i s.t. A(i, j) > 0 do
12:       if f(i) > 0 then
13:           Update: up = min(up, A(i, j)/f(i))
14:       else if f(i) < 0 then
15:           Update: low = max(low, A(i, j)/f(i))
16:       else
17:           Continue;
18:       end if
19:   end for Algorithm 4 Update-General-g (For Solving e.q. 1.7)

20:       if q <= up and q >= low then
21:           Output: g(j) = q;
22:       else if q > up then
23:           Output: g(j) = up;
24:       else
25:           Output: g(j) = low;
26:       end if
27:   end for Algorithm 4 (Update-General-g) is for an arbitrary weight matrix W and is a natural generalization of Update-g. In Update-General-g, diag(W(:,j)) is a diagonal matrix with diagonal elements being W(i,j)(i=1, ..., n). Similar as Update-g, in Update-General-g, g(j) may be updated one by one in each outer loop. For each g (j), it can be solved in a closed formula (steps 20-26). This is due to the fact that the optimization problem described above in eq. 1.7 can be decomposed into/independent optimization problems, each of which only involves a single variable g(j) (j=1, ..., l).

$$\operatorname{argmin}_g \sum_{i,j} ((A(i, j) - f(i)g(j)) \cdot W(i, j))^2 \quad (1.7)$$

s.t.  for all $A(i, j) > 0$:

$$f(i)g(j) \le A(i, j)$$

Based on Algorithm 4, Algorithm 5 (AltQP-Inc-General) may be provided to solve eq. (3.1). AltQP-Inc-General is a natural generalization of AltQP-Inc.

Algorithm 5 AltQP-Inc-General (For Solving e.q. 3.1)

Input: The original matrix $A_{n \times l}$, the weight matrix W, and rank size r
Output: An n × r matrix F; a r × l matrix G; and an n × l matrix R;
1: Initialize F = $0_{n \times r}$, G = $0_{r \times l}$, and R = A
2: for k = 1 : r do
3:    Initialize f and g
4:    while Not convergent do
5:        Update: g ← Update-General-g(R, W, f)
6:        Set: f̃ ← Update-General-g(R', W', g')
7:        Update: f = f̃
8:    end while
9:    Set F(:, k) = f, and G(k, :) = g
10:   Update R ← R − f · g
11: end for Similar as AltQP-Inc, AltQP-Inc-General tries to find the factorized matrices F and G in an incremental way. At each outer loop of Algorithm 5, the algorithm finds a Rank-1 approximation on the current residual matrix R (steps 2-11). At the inner loop of Algorithm 5 (steps 4-8), the algorithm calls Update-General-g to alternatively update f and g, respectively. This alternative process will be iterated until convergence. After the algorithm finds a rank-1 approximation, the current residual matrix is updated in step 10.

Alt QP-Batch for Eq. (3.1)

The optimization problem in eq. (3.1) may also be solved by convex quadratic programming. To this end, assume a package (x=QpProg(T, S, u, v)) to solve the following quadratic programming problem in eq. (1.8).

$$\operatorname{argmin}_{x_{d\times 1}} = x'T_{d\times d}x + u'_{d\times 1}x \qquad (1.8)$$

$$\text{s.t.} \qquad S_{s\times d}x \le v_{s\times 1}$$

In eq. (1.8), x is a d×1 vector that we want to solve and the inequality holds element-wisely. If T is semi-positive definite, QpProg( ) requires at least $O(d^k)$ time (besides the polynomial term, there is usually an additional term in the time complexity which relates to the encoding length of the quadratic programming problem), where k>1 (e.g., k=3, k=3.5) and it depends on the actual methods to solve quadratic programming.

To solve eq. (3.1) by convex quadratic programming, the algorithm (Batch-Update-G) is given to solve the following optimization problem in eq. (1.9), which is a sub-problem of the optimization problem in eq. (3.1).

$$\operatorname{argmin}_G = \sum_{i=1}^{n}\sum_{j=1}^{l}(A(i,j) - F(i,:)G(:,j))^2 W(i,j)^2 \qquad (1.9)$$

$$\text{s.t.} \qquad \text{for all } A(i,j) > 0:$$

$$F(i,:)G(:,j) \le A(i,j)$$

Algorithm 6 (Batch-Update-G) is similar as Update-g except that: in each outer loop of Batch-Update-G, a single r×1 column vector G(:, j) (j=1, ..., l) is found.

| Algorithm 6 Batch-Update-G (For Solving e.q. 1.9) |
|---|
| Input: The original matrix $A_{n\times l}$, the weight matrix $W_{n\times l}$, and left matrix $F_{n\times r}$ |
| Output: The right matrix $G_{r\times l}$ |
| 1:   for j = 1 : l do |
| 2:      Compute: $a_{n\times 1}$ = diag(W(:, j)) · A(:, j) |
| 3:      Compute: $B_{n\times r}$ = diag(W(:, j)) · F |
| 4:      for i = 1 : n do |
| 5:         if A(i, j) > 0 then |
| 6:            Set: v(i) = A(i, j) |
| 7:         else |
| 8:            Set: v(i) = inf |
| 9:         end if |
| 10:     end for |
| 11:     Compute: X = B'B |
| 12:     Compute: u = −2B'a |
| 13:     Set: S = F |
| 14:     Solve G (:, j) ← QpProg(T, S, u, v) |
| 15:  end for |

Whereas in each outer loop of Update-g, a single variable g (j) (j=1, ..., l) is found. This subtle point may lead to a big difference in terms of the time complexity. In Batch-Update-G, expensive convex quadratic programming must be used to find G (:, j); whereas in Update-g, computationally cheap closed formula can be used to find g(j). It can be shown that the quadratic programming problem in step 14 is semi-positive definite which takes at least $O(r^k)$ time, and the overall Batch-Update-G requires at least $O(m+nlr^2+lr^k)$ time.

Based on Batch-Update-G, Algorithm 7 (AltQPBatch) may be provided to solve the problem in eq. (3.1).

| Algorithm 7 AltQP-Batch (For Solving e.q. 3.1) |
|---|
| Input: The original matrix $A_{n\times l}$, the weight matrix W, and rank size r |
| Output: An n × r matrix F; a r × l matrix G; and an n × l matrix R; |
| 1:   Initialize $F_{n\times r}$ and $G_{r\times l}$ |
| 2:   while Not convergent do |
| 3:      Update: G ← Batch-Update-G(A, W, F) |
| 4:      Set: F̃ ← Batch-Update-G(A', W', G') |
| 5:      Update: F = F̃' |
| 6:   end while |
| 7:   Output: R = A − FG |

In AltQP-Batch, after some initialization (step 1), Batch-Update-G may be alternatively called to update F and G by fixing one of them. This alternative process will be iterated until convergence. It can be shown that the time complexity of AltQP-Batch is at least $O(m\ t+nlr^2t+lr^kt+nr^kt)$, where t is the maximum iteration number in AltQP-Batch and k>1 relates to the actual methods to solve the convex quadratic programming. Compared with the complexity of the proposed AltQP-Inc (O(mrt+nrt+lrt)), AltQP-Batch is much more time consuming.

Comparison of Exemplary Aspects of the Present Invention to Conventional Methods Conventional methods related to detecting abnormal behavior on bi-partite graphs can be categorized into three parts: matrix factorization, anomaly detection and general graph mining.

Matrix Factorization

Matrix factorization plays a very important role in graph mining. The most popular choices include SVD/PCA and random projection. However, these methods often ignore the sparseness and nonnegativity of many real graphs and lead to dense and negative results, which make the results hard to interpret. A recent trend in matrix factorization has been devoted to improving the interpretation of the mining results. For example, to address the sparseness issue, the example-based factorization methods have been proposed. By requiring the columns of the factorized matrix F be to actual columns from the original matrix A, the factorization is naturally sparse and therefore good for interpretation.

To address the non-negativity issue, non-negative matrix factorization has been studied in the past few years. There are also efforts to address both the sparseness and non-negativity issues. It is worth pointing out that most, if not all, of these modifications (i.e., sparseness and non-negativity constrains) are imposed on the factorized matrices. As a result, they mainly improve the interpretation for the task of community detection. It is unclear how these efforts can also help to improve the interpretation for the task of anomaly detection.

Improving the interpretation for the task of anomaly detection is one major motivation of the present invention. By imposing the non-negativity constraints on the residual matrix, instead of the factorized matrices, the present invention may bring this interpretation-friendly property (i.e., non-negativity) to graph anomaly detection.

Anomaly Detection

Abnormal sub-graphs are conventionally detected using MDL (minimum description length) criteria. Some conventional methods have proposed using ego-net to detect abnormal nodes on weighted graphs. Other conventional methods have proposed using proximity to detect abnormal nodes and edges.

Further, some conventional methods use matrix factorization to detect port scanning like behavior by looking at the reconstruction error (certain norms of the residual matrix). One limitation of such conventional methods is that the residual matrix in these methods can be arbitrary numbers (either positive or negative). Therefore, the result might be too abstract and not intuitive for data analysts to interpret.

The present invention, however, may restrict the residual matrix to be non-negative so that the residual matrix can be plotted as an intuitive residual graph. From the application side, many graph anomalies correspond to some actual behaviors/activities of certain nodes (e.g., a port-scanner in an IP traffic network has connections to many different IP destinations). Such abnormal behaviors can be naturally captured by the corresponding non-negative entries in the residual matrix R.

General Graph Mining

There is a lot of research work on static graph mining, including pattern and law mining frequent substructure discovery, influence propagation, social networks compression and community mining, etc. More recently, there is an increasing interest in mining time-evolving graphs, such as densification laws and shrinking diameters, community evolution, proximity tracking, conversation dynamics and dynamic communities, etc.

Other Exemplary Aspects of the Present Invention

FIGS. 7A-7D illustrate other exemplary aspects of the present invention.

Figure 7A:
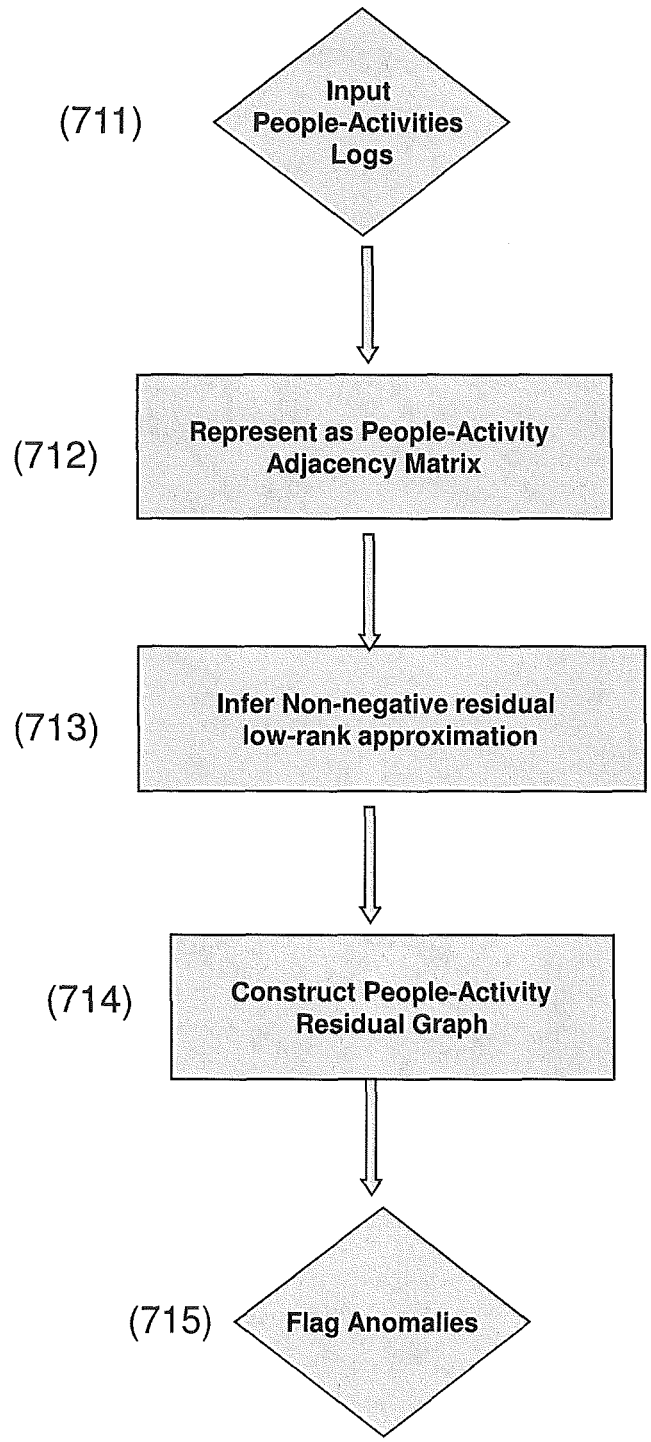
FIGS. 7A-7D illustrate methods 710, 720, 730 and 740 of detecting anomalies in a bipartite graph, respectively, in accordance with an exemplary aspect of the present invention.

In particular, FIG. 7A illustrates a method 710 of detecting anomalies in a bipartite graph. The method 710 includes inputting (711) people-activity logs, representing (712) the data from the people-activity logs as a people-activity adjacency matrix, inferring (713) (e.g., analyzing the graph to determine) a non-negative residual low-rank approximation, constructing (714) a people-activity residual graph, and flagging (715) anomalies in the residual graph.

Figure 7B:
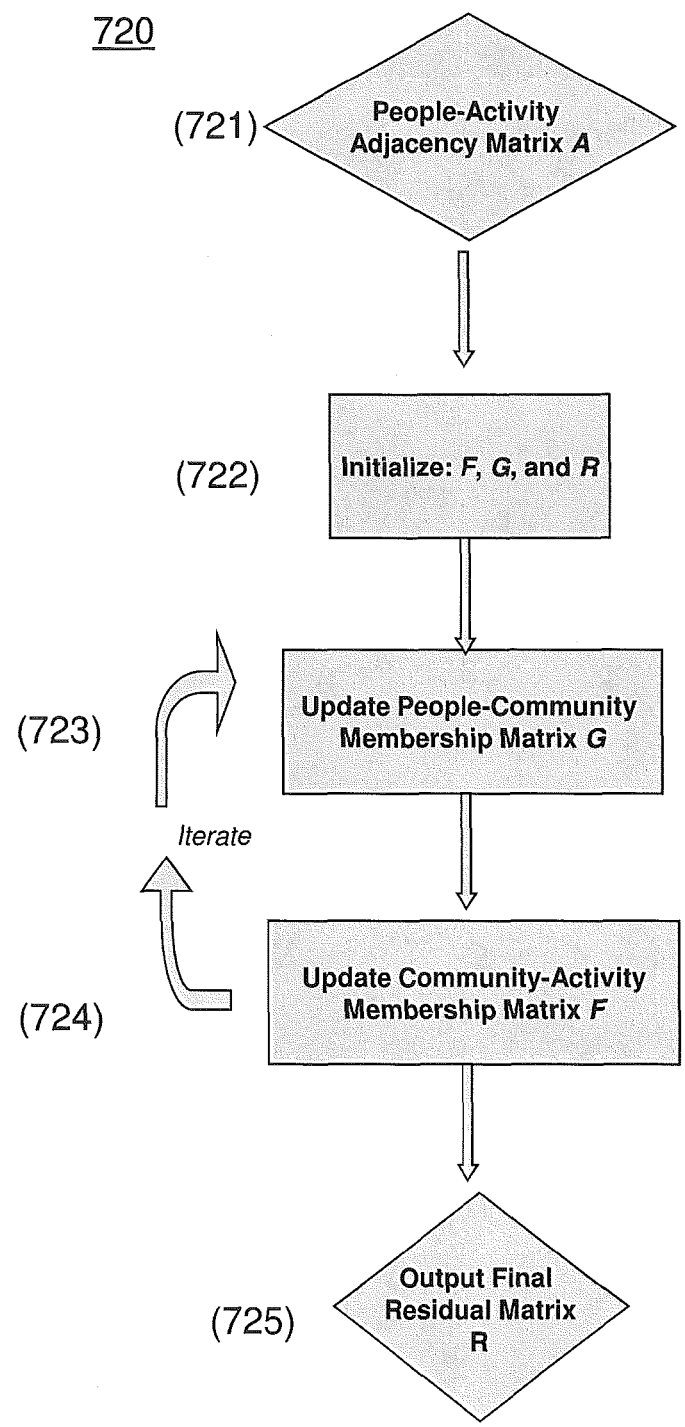

FIG. 7B illustrates a method 720 of detecting anomalies in a bipartite graph. The method 720 includes providing (721) a people-activity adjacency matrix A, initializing (722) the matrices F, G and R, iteratively updating (723) matrix G and updating (724) matrix F, and outputting (725) the final residual matrix R.

Figure 7C:
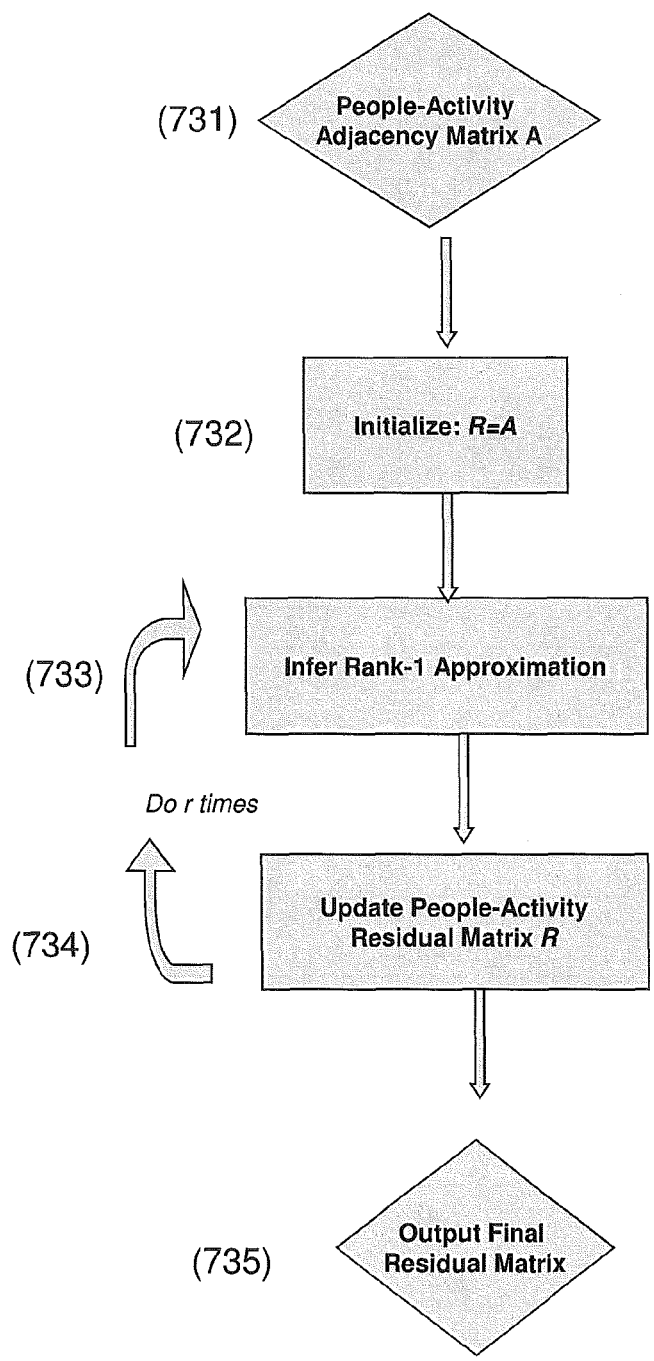

FIG. 7C illustrates a method 730 of detecting anomalies in a bipartite graph. The method 730 includes providing (731) a people-activity adjacency matrix A, initializing (732) the people-activity residual matrix R to be equal to the people-activity adjacency matrix A, iteratively (e.g., doing r times) inferring (733) (e.g., analyzing the graph to determine) a rank-1 approximation and updating (734) the people-activity residual matrix R, and outputting (735) the final residual matrix R.

Figure 7D:
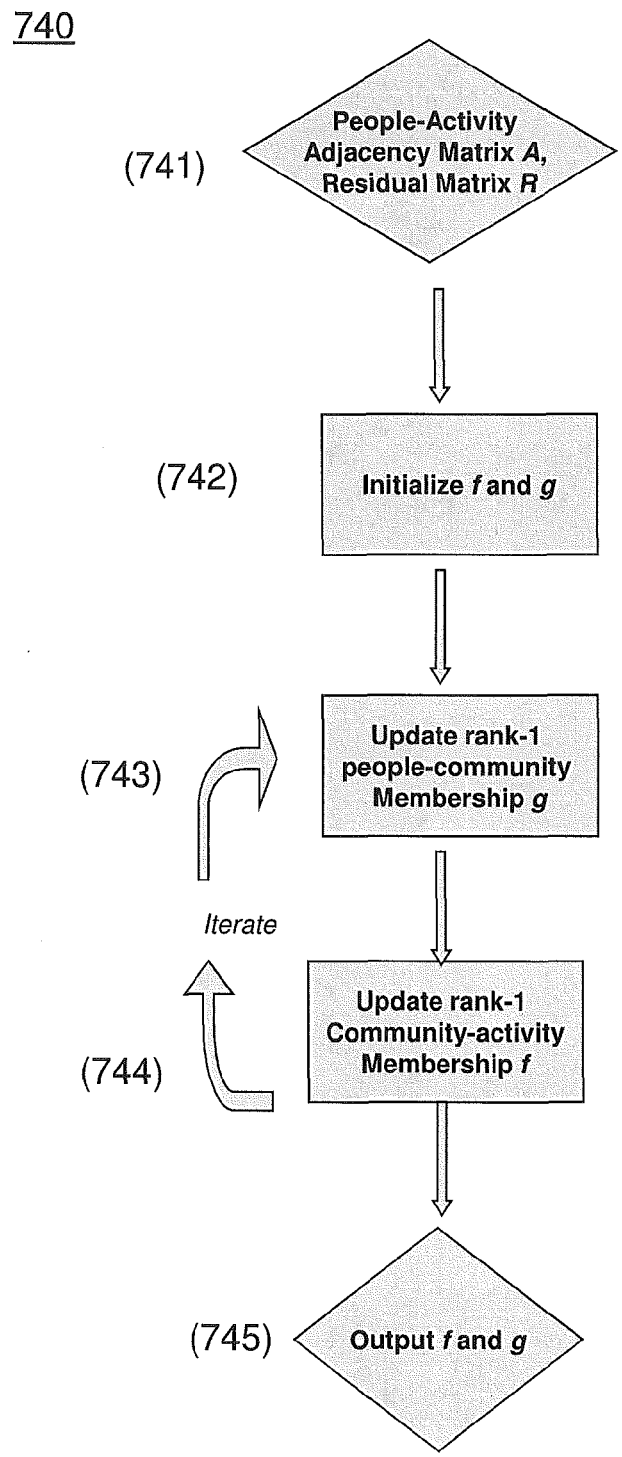
Figure 8:
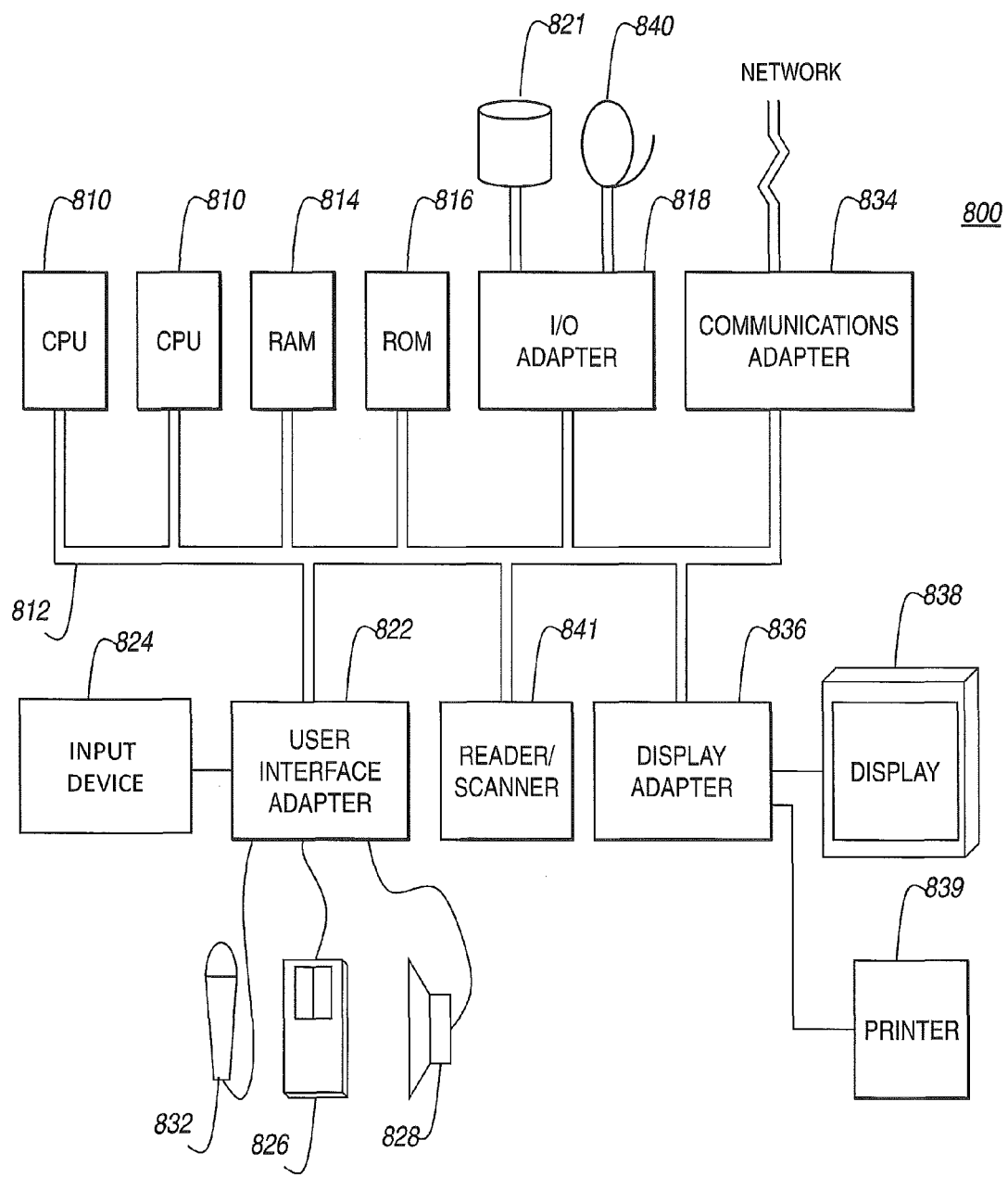
FIG. 8 illustrates a typical hardware configuration 800 that may be used to implement the network and method (e.g., system 200, method 100, method 710, method 720, method 730 and method 740), in accordance with an exemplary aspect of the present invention.
Figure 9:
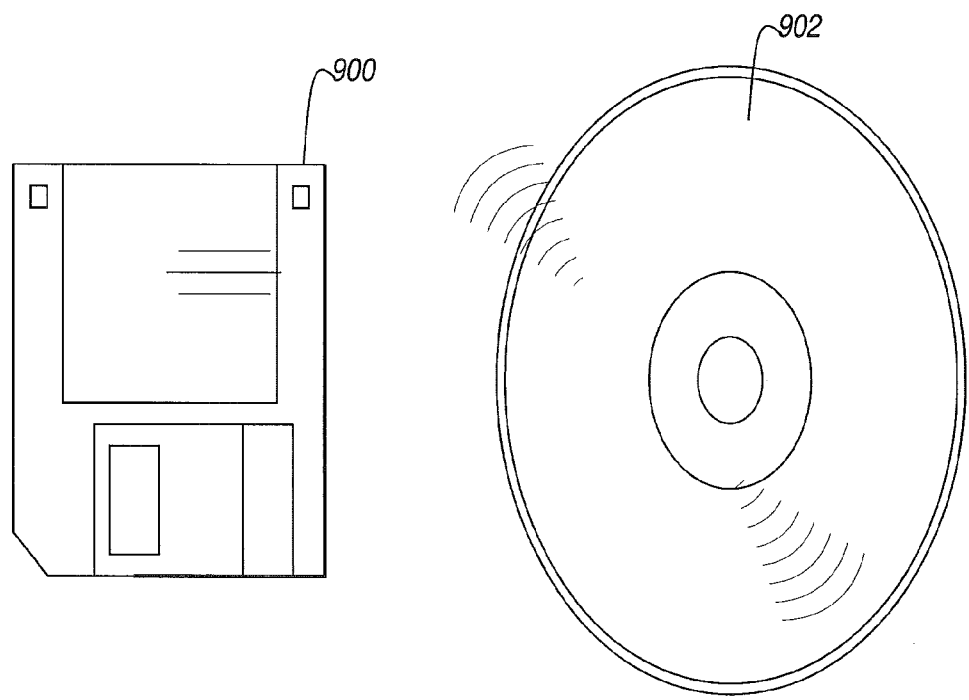
FIG. 9 illustrates a magnetic data storage diskette 900 and compact disc (CD) 902 that may be used to store instructions for performing the inventive method of the present invention (e.g., system 200, method 100, method 710, method 720, method 730 and method 740), in accordance with an exemplary aspect of the present invention.

FIG. 7D illustrates a method 740 of detecting anomalies in a bipartite graph. The method 740 includes providing (741) a people-activity adjacency matrix A, initializing (742) the rank-1 community-activity membership f and the rank-1 people-community membership g, updating (743) the rank-1 people-community membership g, updating (744) the rank-1 community-activity membership f, and outputting (745) the final rank-1 community-activity membership f and the rank-1 people-community membership g.

Another exemplary method of detecting anomalies in a large bipartite graph according to the present invention, includes receiving a bipartite graph and desired rank size r as inputs, representing the graph as an adjacency matrix A, decomposing the adjacency matrix A into two rank-r matrices (F and G) and a residual matrix R, s.t., (e.g., performing a low-rank decomposition on A: A=F×G+R, where non-negative residuals R(i,j)>=0 for each (i,j) that A(i,j)>0), generating a residual graph based on the residual matrix R, and outputting the top-k edges in the residual graph as anomalies.

Another exemplary method (e.g., a Batch Mode) of detecting anomalies in a large bipartite graph according to the present invention, includes receiving an adjacency matrix A and desired rank size r as inputs, initializing two rank-r matrices (F and G) and a residual matrix R, s.t., (e.g., performing a low-rank decomposition on A: A=F×G+R, where non-negative residuals R(i,j)>=0 for each (i,j) that A(i,j)>0), iterating until convergence (e.g., iteratively updating the matrix G while fixing the matrix F, and updating the matrix F while fixing the matrix G), and outputting R=A−F×G as the final residual matrix.

Further, in the Batch Mode the updating of the matrix G may include receiving an adjacency matrix A and the current matrix F of rank size r as input, and outputting a rank-r matrix G by solving the following quadratic programming problem for $\text{argmin}_G$:

$$= \sum_{i=1}^{n} \sum_{j=1}^{l} (A(i, j) - F(i, :)G(:, j))^2$$

s.t. for all $A(i, j) > 0$:

$$F(i, :)G(:, j) \leq A(i, j).$$

Another exemplary method (e.g., an Incremental Mode) of detecting anomalies in a large bipartite graph according to the present invention, includes receiving an adjacency matrix A and desired rank size r as inputs, initializing the residual matrix R as A, iteratively (e.g., r times) finding a non-negative residual rank-1 approximation of the current residual matrix R (e.g., R~f×g, and R(i,j)>=f(i)×g(j) for each (i,j) that A(i,j)>0) and updating the current residual matrix R, s.t. (e.g., for each (i,j) that A(i,j)>0: R(i,j)←(R(i,j)−f(i)×g(j)), and outputting R as the final residual matrix.

Further, in the Incremental Mode, the non-negative residual rank-1 approximation of the current residual matrix R may include receiving an adjacency matrix A, and current residual matrix R as input, initializing a column vector f and a row vector g, s.t., for each (i,j) that A(i,j)>0, R(i,j)>=f(i)×g(j), iteratively update column vector g while fixing row vector f and updating row vector f while fixing column vector g until convergence, and outputting f and g as the rank-1 approximation of R.

Further, in the Incremental Mode, the updating of column vector g may include receiving an adjacency matrix A, the current residual matrix R, and the current row vector f as input, and for each j (j=1, . . . , l) compute g(j) by solving the following boundary quadratic optimization problem:

$$\text{argmin}_{g(j)} \quad g(j)^2 - 2qg(j) \quad (4.6)$$

s.t. $\text{low} \leq g(j) \leq \text{up}$ where: $q = \left( \sum_{i, A(i,j)>0} f(i)A(i,j) \right) / \left( \sum_{i, A(i,j)>0} f(i)^2 \right)$ $\text{low} = \max_{f(i)<0, A(i,j)>0} \{A(i, j)/f(i)\}$ $\text{up} = \max_{f(i)>0, A(i,j)>0} \{A(i, j)/f(i)\}$ Referring now to FIG. 8, system 800 illustrates a typical hardware configuration which may be used for implementing the system (e.g., system 200) and method of the present invention (e.g., method 100, method 710, method 720, method 730 and method 740). The configuration has preferably at least one processor or central processing unit (CPU) 811. The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 828, speaker 828, microphone 832, pointing stick 827 and/or other user interface device to the bus 812), a communication adapter 834 for connecting an information handling system to a data processing network, the Internet, an Intranet, an area network (PAN), etc., and a display adapter 836 for connecting the bus 812 to a display device 838 and/or printer 839. Further, an automated reader/scanner 841 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 811 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 811 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 900 or compact disc 902 (FIG. 9), directly or indirectly accessible by the CPU 811.

Whether contained in the computer server/CPU 811, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may include software object code, compiled from a language such as C, C++, etc.

With its unique and novel features, the present invention provides a method of method of detecting anomalies in a large bipartite graph which is more effective and more efficient than conventional methods and systems.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive method and system is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of detecting anomalies from a bipartite graph, comprising:
    analyzing the graph to determine a row-cluster membership, a column-cluster membership and a non-negative residual matrix, the analyzing of the graph comprising updating the row-cluster membership and the column-cluster membership; and
    in a processor, detecting the anomalies from the non-negative residual matrix.

2. The method of claim 1, wherein the anomalies comprise abnormal nodes and edges in the bipartite graph.

3. The method of claim 1, further comprising:
    generating the graph from a data set,
    wherein the analyzing comprises inferring the row-cluster membership, column-cluster membership and non-negative residual matrix from the graph.

4. The method of claim 3, wherein the detecting of anomalies comprises flagging abnormalities in the non-negative residual matrix.

5. The method of claim 1, wherein the bipartite graph comprises a people-activity graph and the anomalies comprise abnormal human behavior.

6. The method of claim 5, further comprising:
    generating the people-activity graph from activity logs of a set of people,
    wherein the analyzing comprises inferring people-community membership, community-activity membership and a non-negative people-activity residual matrix; and
    wherein the detecting of anomalies comprises flagging the abnormal human behavior from the non-negative people-activity residual matrix.

7. The method of claim 6, wherein the inferring of the people-community membership, community-activity membership and the non-negative people-activity residual matrix comprises:
    setting an initial people-community membership, an initial community-activity membership, and an initial non-negative people-activity residual matrix;
    updating the initial people-community membership; and
    updating the initial community-activity membership.

8. The method of claim 7, wherein the updating of the initial people-community membership comprises:
    fixing and/or freezing the community-activity membership; and
    re-calculating a strength of each person of the set of people belonging to a community including the set of people.

9. The method of claim 6, wherein the inferring of the people-community membership, community-activity membership and the non-negative people-activity residual matrix comprises:
    setting an initial non-negative people-activity residual matrix;
    inferring a rank-1 people-community membership and a rank-1 community-activity membership; and
    updating the non-negative people-activity residual matrix.

10. The method of claim 9, wherein the inferring of the rank-1 people-community membership and the rank-1 community-activity membership comprises:

setting an initial rank-1 people-community membership, an initial rank-1 community-activity membership, and an initial non-negative people-activity residual matrix;

updating the initial rank-1 people-community membership; and updating the initial rank-1 community-activity membership.

11. The method of claim 10, wherein the updating of the initial rank-1 people-community membership comprises:

fixing and/or freezing the rank-1 community-activity membership; and re-calculating a strength of each person of the set of people belonging to a community including the set of people.

12. The method of claim 1, wherein the bipartite graph comprises an Internet Protocol (IP) source-destination graph and the anomalies comprise abnormal IP addresses.

13. The method of claim 12, further comprising:

generating an IP source-destination graph from IP trace logs, wherein the analyzing comprises inferring an IP source-role membership, an IP destination-role membership and a non-negative IP source-destination residual matrix; and wherein the detecting of anomalies comprises flagging abnormal IP addresses from the non-negative IP source-destination residual matrix.

14. The method of claim 1, wherein the updating of the initial row-cluster membership and the initial column-cluster membership, comprises iteratively updating the initial row-cluster membership and updating the initial column-cluster membership.

15. The method of claim 1, wherein the analyzing of the graph comprises setting an initial row-cluster membership and an initial column-cluster membership, and the updating of the row-cluster membership and the column-cluster membership comprises updating the initial row-cluster membership and the initial column-cluster membership.

16. A system for detecting anomalies from a bipartite graph, comprising:

an analyzer for analyzing the graph to determine a row-cluster membership, a column-cluster membership and a non-negative residual matrix, the analyzing of the graph comprising updating the row-cluster membership and the column-cluster membership; and a detector for detecting the anomalies from the non-negative residual matrix.

17. The system of claim 16, further comprising:

a graph generator for generating the graph from a data set, wherein the analyzer infers the row-cluster membership, column-cluster membership and non-negative residual matrix from the graph, and wherein the detector comprises a flagging device for flagging abnormalities in the non-negative residual matrix.

18. The system of claim 16, wherein the analyzer comprises:

an initial setting device for setting an initial row-cluster membership, an initial column-cluster membership, and an initial non-negative residual matrix;

an updater for updating the initial row-cluster membership, and updating the initial column-cluster membership.

19. The system of claim 18, wherein the updater for updating the initial column-cluster membership comprises:

a fixing/freezing device for fixing and/or freezing the column-cluster membership; and a strength re-calculator for re-calculating a strength of each member in the column-cluster membership.

20. The system of claim 16, wherein the analyzer comprises:

a setting device for setting an initial non-negative residual matrix; and an updater for updating the initial non-negative residual matrix, wherein the analyzer infers a rank-1 row-cluster membership and a rank-1 column-cluster membership by:

setting an initial rank-1 row-cluster membership, an initial rank-1 column-cluster membership, and an initial non-negative residual matrix;

updating the initial rank-1 row-cluster membership; and updating the initial rank-1 column-cluster membership.

21. The system of claim 20, wherein the updater for updating the initial rank-1 row-cluster membership comprises:

a fixing/freezing device for fixing and/or freezing the rank-1 column-cluster membership; and a strength re-calculator for re-calculating a strength of each member in the column-cluster membership.

22. A programmable storage medium tangibly embodying a program of machine-readable instructions executable by a digital processing apparatus to perform a method of detecting anomalies from a bipartite graph, the method comprising:

analyzing the graph to determine a row-cluster membership, a column-cluster membership and a non-negative residual matrix, the analyzing of the graph comprising updating the row-cluster membership and the column-cluster membership; and in a processor, detecting the anomalies from the non-negative residual matrix.

* * * * *